(12) United States Patent
Glass et al.

(10) Patent No.: US 11,111,065 B2
(45) Date of Patent: Sep. 7, 2021

(54) GIFT CARD PRESENTATION DEVICES

(71) Applicant: e2interactive, Inc., Atlanta, GA (US)

(72) Inventors: Brett R. Glass, Kansas City, MO (US); Nicole E. Glass, Kansas City, MO (US)

(73) Assignee: E2INTERACTIVE, INC., Atlanta, GA (US)

( * ) Notice: Subject to any disclaimer, the term of this patent is extended or adjusted under 35 U.S.C. 154(b) by 0 days.

(21) Appl. No.: 15/431,535

(22) Filed: Feb. 13, 2017

(65) Prior Publication Data
US 2017/0152092 A1    Jun. 1, 2017

Related U.S. Application Data

(62) Division of application No. 14/181,668, filed on Feb. 15, 2014, now Pat. No. 9,565,911.

(Continued)

(51) Int. Cl.
*B65D 73/00* (2006.01)
*B65D 27/04* (2006.01)
(Continued)

(52) U.S. Cl.
CPC .......... *B65D 73/0078* (2013.01); *A45C 11/18* (2013.01); *B65D 27/00* (2013.01); *B65D 27/04* (2013.01); *B65D 27/22* (2013.01); *G06K 19/06028* (2013.01); *G06Q 20/387* (2013.01); *G06Q 99/00* (2013.01); *G07F 17/00* (2013.01); *G09F 23/10* (2013.01); *B65D 2203/00* (2013.01); *G06Q 20/354* (2013.01)

(58) Field of Classification Search
CPC .... A45C 11/18; B65D 27/00; B65D 73/0078; B65D 73/00; B65D 85/00; B65D 2203/00; G06Q 20/387; G06Q 99/00; G07F 17/00; G09F 23/10
USPC ............. 206/39, 484, 468, 308.1; 40/124.19, 40/124.06
See application file for complete search history.

(56) References Cited

U.S. PATENT DOCUMENTS 794,417 A    7/1905  Maniachi
3,288,350 A    11/1966  Kushner
(Continued)

FOREIGN PATENT DOCUMENTS

EP    0950968 A4    5/2004
EP    1519332 A1    3/2005
(Continued)

OTHER PUBLICATIONS

Eazel, William, "Paypal intros SMS Payments," http://www.v3co.uk/articles/print/2152694, vnunet.com, Mar. 24, 2006, 1 page.
(Continued)

*Primary Examiner* — Chun Hoi Cheung
(74) *Attorney, Agent, or Firm* — Landmark Intellectual Property Law, PC; Gregory M Murphy

(57) ABSTRACT

The disclosed invention relates generally to various embodiments of holders and packaging for giving gifts. In particular, the invention relates to various gift card holders that hold a gift card and enhance the presentation and gift giving experience for recipients and gift givers alike. The holders and packing also permit a gift card disposed therein to be visible, scanned, accessed, or otherwise activated without removing the gift card from the holder.

14 Claims, 21 Drawing Sheets

Related U.S. Application Data

(60) Provisional application No. 61/765,594, filed on Feb. 15, 2013.

(51) Int. Cl.

| | | |
|---|---|---|
| *B65D 27/22* | (2006.01) | |
| *B65D 27/00* | (2006.01) | |
| *G06Q 20/38* | (2012.01) | |
| *A45C 11/18* | (2006.01) | |
| *G07F 17/00* | (2006.01) | |
| *G06K 19/06* | (2006.01) | |
| *G06Q 99/00* | (2006.01) | |
| *G09F 23/10* | (2006.01) | |
| *G06Q 20/34* | (2012.01) | |

(56) References Cited

U.S. PATENT DOCUMENTS

| | | |
|---|---|---|
| 4,068,213 A | 1/1978 | Nakamura et al. |
| 4,482,802 A | 11/1984 | Aizawa et al. |
| 4,734,858 A | 3/1988 | Schlafly |
| 4,747,049 A | 5/1988 | Richardson et al. |
| 4,755,940 A | 7/1988 | Brachtl et al. |
| 4,767,917 A | 8/1988 | Ushikubo |
| 4,795,892 A | 1/1989 | Gilmore et al. |
| 4,877,947 A | 10/1989 | Mori |
| 4,900,904 A | 2/1990 | Wright et al. |
| 4,908,521 A | 3/1990 | Boggan et al. |
| 4,943,707 A | 7/1990 | Boggan |
| 5,091,634 A | 2/1992 | Finch et al. |
| 5,117,355 A | 5/1992 | McCarthy |
| 5,202,826 A | 4/1993 | McCarthy |
| 5,255,182 A | 10/1993 | Adams |
| 5,256,863 A | 10/1993 | Ferguson et al. |
| 5,311,424 A | 5/1994 | Mukherjee et al. |
| 5,367,148 A | 11/1994 | Storch et al. |
| 5,375,240 A | 12/1994 | Grundy |
| 5,383,113 A | 1/1995 | Kight et al. |
| 5,384,449 A | 1/1995 | Peirce |
| 5,421,452 A * | 6/1995 | Hybiske .............. B65D 85/548 206/308.1 |
| 5,465,288 A | 11/1995 | Falvey et al. |
| 5,477,038 A | 12/1995 | Levine et al. |
| 5,500,513 A | 3/1996 | Langhans et al. |
| 5,502,765 A | 3/1996 | Ishiguro et al. |
| 5,511,114 A | 4/1996 | Stimson et al. |
| 5,577,109 A | 11/1996 | Stimson et al. |
| 5,581,064 A | 12/1996 | Riley et al. |
| 5,590,038 A | 12/1996 | Pitroda |
| 5,602,377 A | 2/1997 | Beller et al. |
| 5,619,559 A | 4/1997 | Kennedy |
| 5,621,201 A | 4/1997 | Langhans et al. |
| 5,621,787 A | 4/1997 | McKoy et al. |
| 5,644,721 A | 7/1997 | Chung et al. |
| 5,657,389 A | 8/1997 | Houvener |
| 5,671,279 A | 9/1997 | Elgamal |
| 5,679,938 A | 10/1997 | Templeton et al. |
| 5,679,940 A | 10/1997 | Templeton et al. |
| 5,696,909 A | 12/1997 | Wallner |
| 5,699,528 A | 12/1997 | Hogan |
| 5,705,798 A | 1/1998 | Tarbox |
| 5,708,780 A | 1/1998 | Levergood et al. |
| 5,721,768 A | 2/1998 | Stimson et al. |
| 5,721,781 A | 2/1998 | Deo et al. |
| 5,729,693 A | 3/1998 | Holda-Fleck |
| 5,732,136 A | 3/1998 | Murphree et al. |
| 5,734,719 A | 3/1998 | Tsevdos et al. |
| 5,740,915 A | 4/1998 | Williams |
| 5,754,655 A | 5/1998 | Hughes et al. |
| 5,760,381 A | 6/1998 | Stich et al. |
| 5,777,305 A | 7/1998 | Smith et al. |
| 5,799,285 A | 8/1998 | Klingman |
| 5,806,045 A | 9/1998 | Biorge et al. |
| 5,828,740 A | 10/1998 | Khuc et al. |
| 5,844,972 A | 12/1998 | Jagadish et al. |
| 5,850,217 A | 12/1998 | Cole |
| 5,857,175 A | 1/1999 | Day et al. |
| 5,873,072 A | 2/1999 | Kight et al. |
| 5,878,401 A | 3/1999 | Joseph |
| 5,884,271 A | 3/1999 | Pitroda |
| 5,884,770 A * | 3/1999 | Galm ................... B42D 15/042 206/232 |
| 5,889,270 A | 3/1999 | Haagen et al. |
| 5,889,863 A | 3/1999 | Weber |
| 5,897,625 A | 4/1999 | Gustin et al. |
| 5,903,633 A | 5/1999 | Lorsch |
| 5,903,830 A | 5/1999 | Joao et al. |
| 5,903,874 A | 5/1999 | Leonard et al. |
| 5,907,142 A | 5/1999 | Kelsey |
| 5,909,492 A | 6/1999 | Payne et al. |
| 5,913,210 A | 6/1999 | Call |
| 5,918,213 A | 6/1999 | Bernard et al. |
| 5,930,363 A | 7/1999 | Stanford et al. |
| 5,945,653 A | 8/1999 | Walker et al. |
| 5,950,173 A | 9/1999 | Perkowski |
| 5,953,710 A | 9/1999 | Fleming |
| 5,956,695 A | 9/1999 | Carrithers et al. |
| 5,956,700 A | 9/1999 | Landry |
| 5,968,110 A | 10/1999 | Westrope et al. |
| 5,984,508 A | 11/1999 | Hurley |
| 5,988,509 A | 11/1999 | Taskett |
| 5,991,413 A | 11/1999 | Arditti et al. |
| 5,991,748 A | 11/1999 | Taskett |
| 5,991,749 A | 11/1999 | Morrill, Jr. |
| 5,999,624 A | 12/1999 | Hopkins |
| 6,000,608 A | 12/1999 | Dorf |
| 6,012,049 A | 1/2000 | Kawan |
| 6,018,570 A | 1/2000 | Matison |
| 6,025,780 A | 2/2000 | Bowers et al. |
| 6,029,139 A | 2/2000 | Cunningham et al. |
| 6,029,141 A | 2/2000 | Bezos et al. |
| 6,029,151 A | 2/2000 | Nikander |
| 6,032,135 A | 2/2000 | Molano et al. |
| 6,032,859 A | 3/2000 | Muehlberger et al. |
| 6,039,244 A | 3/2000 | Finsterwald |
| 6,049,778 A | 4/2000 | Walker et al. |
| 6,055,511 A | 4/2000 | Luebbering et al. |
| 6,055,567 A | 4/2000 | Ganesan et al. |
| 6,058,300 A | 5/2000 | Hanson |
| 6,058,382 A | 5/2000 | Kasai et al. |
| 6,062,472 A | 5/2000 | Cheung |
| 6,070,150 A | 5/2000 | Remington et al. |
| 6,085,167 A | 7/2000 | Iguchi |
| 6,085,242 A | 7/2000 | Chandra |
| 6,088,682 A | 7/2000 | Burke |
| 6,092,053 A | 7/2000 | Boesch et al. |
| 6,098,053 A | 8/2000 | Slater |
| 6,105,008 A | 8/2000 | Davis et al. |
| 6,119,164 A | 9/2000 | Basche |
| 6,125,352 A | 9/2000 | Franklin et al. |
| 6,129,276 A | 10/2000 | Jelen et al. |
| 6,134,533 A | 10/2000 | Shell |
| 6,138,106 A | 10/2000 | Walker et al. |
| 6,138,911 A | 10/2000 | Fredregill et al. |
| 6,142,369 A | 11/2000 | Jonstromer |
| 6,148,249 A | 11/2000 | Newman |
| 6,167,387 A | 12/2000 | Lee-Wai-Yin |
| 6,169,890 B1 | 1/2001 | Vatanen |
| 6,173,272 B1 | 1/2001 | Thomas et al. |
| 6,175,823 B1 | 1/2001 | Dusen |
| 6,185,545 B1 | 2/2001 | Resnick et al. |
| 6,188,752 B1 | 2/2001 | Lesley |
| 6,219,652 B1 | 4/2001 | Carter et al. |
| 6,222,914 B1 | 4/2001 | McMullin |
| 6,226,364 B1 | 5/2001 | O'Neil |
| 6,240,397 B1 | 5/2001 | Sachs |
| 6,256,690 B1 | 7/2001 | Carper |
| 6,282,566 B1 | 8/2001 | Lee, Jr. et al. |
| 6,285,749 B1 | 9/2001 | Manto |
| 6,289,322 B1 | 9/2001 | Kitchen et al. |
| 6,295,522 B1 | 9/2001 | Boesch |
| 6,304,860 B1 | 10/2001 | Martin, Jr. et al. |
| 6,308,887 B1 | 10/2001 | Korman et al. |

(56) References Cited

U.S. PATENT DOCUMENTS

| | | |
|---|---|---|
| 6,311,165 B1 | 10/2001 | Coutts et al. |
| 6,311,170 B1 | 10/2001 | Embrey |
| 6,314,171 B1 | 11/2001 | Dowens |
| 6,315,195 B1 | 11/2001 | Ramachandran |
| 6,317,028 B1 | 11/2001 | Valiulis |
| 6,324,525 B1 | 11/2001 | Kramer et al. |
| 6,327,577 B1 | 12/2001 | Garrison et al. |
| 6,330,544 B1 | 12/2001 | Walker et al. |
| 6,332,135 B1 | 12/2001 | Conklin et al. |
| 6,333,976 B2 | 12/2001 | Lesley |
| 6,334,116 B1 | 12/2001 | Ganesan et al. |
| 6,360,254 B1 | 3/2002 | Linden et al. |
| 6,363,362 B1 | 3/2002 | Burfield et al. |
| 6,363,364 B1 | 3/2002 | Nel |
| 6,366,893 B2 | 4/2002 | Hannula et al. |
| 6,375,073 B1 | 4/2002 | Aebi et al. |
| 6,422,462 B1 | 7/2002 | Cohen |
| 6,424,706 B1 | 7/2002 | Katz et al. |
| 6,434,238 B1 | 8/2002 | Chaum et al. |
| 6,442,532 B1 | 8/2002 | Kawan |
| 6,467,684 B2 | 10/2002 | Fite et al. |
| 6,473,500 B1 | 10/2002 | Risafi et al. |
| 6,473,739 B1 | 10/2002 | Showghi et al. |
| 6,494,367 B1 | 12/2002 | Zacharias |
| 6,502,745 B1 | 1/2003 | Stimson et al. |
| 6,507,823 B1 | 1/2003 | Nel |
| 6,529,956 B1 | 3/2003 | Smith et al. |
| 6,536,659 B1 | 3/2003 | Hauser et al. |
| 6,542,933 B1 | 4/2003 | Durst, Jr. et al. |
| 6,550,672 B1 | 4/2003 | Tracy et al. |
| 6,575,361 B1 | 6/2003 | Graves et al. |
| 6,581,827 B2 | 6/2003 | Welton |
| 6,591,098 B1 | 7/2003 | Shieh et al. |
| 6,594,640 B1 | 7/2003 | Postrel |
| 6,594,644 B1 | 7/2003 | Dusen |
| 6,609,113 B1 | 8/2003 | O'Leary et al. |
| 6,615,189 B1 | 9/2003 | Phillips et al. |
| 6,615,190 B1 | 9/2003 | Slater |
| 6,622,015 B1 | 9/2003 | Himmel et al. |
| 6,636,833 B1 | 10/2003 | Flitcroft et al. |
| 6,648,222 B2 | 11/2003 | McDonald et al. |
| 6,651,885 B1 | 11/2003 | Arias |
| 6,659,259 B2 | 12/2003 | Knox et al. |
| 6,678,664 B1 | 1/2004 | Ganesan |
| 6,684,269 B2 | 1/2004 | Wagner |
| 6,705,520 B1 | 3/2004 | Pitroda et al. |
| 6,732,459 B1 * | 5/2004 | Clark ............... B42D 15/045 206/308.1 |
| 6,745,022 B2 | 6/2004 | Knox |
| 6,769,607 B1 | 8/2004 | Pitroda et al. |
| 6,805,289 B2 | 10/2004 | Noriega et al. |
| 6,807,410 B1 | 10/2004 | Pailles et al. |
| 6,819,219 B1 | 11/2004 | Bolle et al. |
| 6,827,260 B2 | 12/2004 | Stoutenburg et al. |
| 6,829,596 B1 | 12/2004 | Frazee |
| 6,836,765 B1 | 12/2004 | Sussman |
| 6,836,962 B2 | 1/2005 | Khandros et al. |
| 6,839,692 B2 | 1/2005 | Carrott et al. |
| 6,839,744 B1 | 1/2005 | Kloba et al. |
| 6,848,613 B2 | 2/2005 | Nielsen et al. |
| 6,856,974 B1 | 2/2005 | Ganesan et al. |
| 6,868,391 B1 | 3/2005 | Hultgren |
| 6,877,263 B2 * | 4/2005 | Clark ............... B42D 15/045 206/308.1 |
| 6,882,984 B1 | 4/2005 | Boyle et al. |
| 6,915,277 B1 | 7/2005 | Manchester et al. |
| 6,918,537 B2 | 7/2005 | Graves et al. |
| 6,925,439 B1 | 8/2005 | Pitroda |
| 6,932,268 B1 | 8/2005 | McCoy et al. |
| 6,934,529 B2 | 8/2005 | Bagoren et al. |
| 6,934,689 B2 | 8/2005 | Ritter et al. |
| 6,941,270 B1 | 9/2005 | Hannula |
| 6,948,063 B1 | 9/2005 | Ganesan et al. |
| 6,961,412 B2 | 11/2005 | Ruckart et al. |
| 6,965,866 B2 | 11/2005 | Klein |
| 6,966,135 B1 * | 11/2005 | McDonald ......... G11B 33/0422 206/232 |
| 6,975,937 B1 | 12/2005 | Kantarjiev et al. |
| 6,988,657 B1 | 1/2006 | Singer et al. |
| 6,993,510 B2 | 1/2006 | Guy et al. |
| 7,014,107 B2 | 3/2006 | Singer et al. |
| 7,016,863 B1 | 3/2006 | Kamakura et al. |
| 7,024,174 B2 | 4/2006 | Nagy et al. |
| 7,024,396 B2 | 4/2006 | Woodward |
| 7,054,842 B2 | 5/2006 | James et al. |
| 7,069,248 B2 | 6/2006 | Huber |
| 7,072,854 B2 | 7/2006 | Loeser |
| 7,072,864 B2 | 7/2006 | Brake, Jr. et al. |
| 7,083,084 B2 | 8/2006 | Graves et al. |
| 7,085,931 B1 | 8/2006 | Smith et al. |
| 7,086,584 B2 | 8/2006 | Stoutenburg et al. |
| 7,093,761 B2 | 8/2006 | Smith et al. |
| 7,117,227 B2 | 10/2006 | Call |
| 7,128,274 B2 | 10/2006 | Kelley et al. |
| 7,130,817 B2 | 10/2006 | Karas et al. |
| 7,131,582 B2 | 11/2006 | Welton |
| 7,143,055 B1 | 11/2006 | Perkowski |
| 7,162,440 B2 | 1/2007 | Koons |
| 7,165,052 B2 | 1/2007 | Diveley et al. |
| 7,182,252 B1 | 2/2007 | Cooper et al. |
| 7,194,438 B2 | 3/2007 | Sovio et al. |
| 7,209,889 B1 | 4/2007 | Whitfield |
| 7,209,890 B1 | 4/2007 | Peon et al. |
| 7,216,092 B1 | 5/2007 | Weber et al. |
| 7,219,829 B2 * | 5/2007 | Treat ............... B42D 15/042 229/71 |
| 7,222,101 B2 | 5/2007 | Bishop et al. |
| 7,229,006 B2 | 6/2007 | Babbi et al. |
| 7,229,014 B1 | 6/2007 | Snyder |
| 7,243,839 B2 | 7/2007 | Beck et al. |
| 7,249,054 B2 | 7/2007 | Keil |
| 7,249,097 B2 | 7/2007 | Hutchison et al. |
| 7,269,256 B2 | 9/2007 | Rosen |
| 7,292,998 B2 | 11/2007 | Graves et al. |
| 7,316,350 B2 | 1/2008 | Algiene |
| 7,328,190 B2 | 2/2008 | Smith et al. |
| 7,333,955 B2 | 2/2008 | Graves et al. |
| 7,356,327 B2 | 4/2008 | Cai et al. |
| 7,363,265 B2 | 4/2008 | Horgan |
| 7,370,012 B2 | 5/2008 | Karns et al. |
| 7,376,431 B2 | 5/2008 | Niedermeyer |
| 7,383,226 B2 | 6/2008 | Kight et al. |
| 7,398,248 B2 | 7/2008 | Phillips et al. |
| 7,400,883 B2 | 7/2008 | Rivers et al. |
| 7,415,617 B2 | 8/2008 | Ginter et al. |
| 7,437,328 B2 | 10/2008 | Graves et al. |
| 7,490,720 B2 * | 2/2009 | Cole ............... B42D 15/022 206/232 |
| 7,494,417 B2 | 2/2009 | Walker et al. |
| 7,519,543 B2 | 4/2009 | Ota et al. |
| 7,536,349 B1 | 5/2009 | Mik et al. |
| 7,566,000 B2 | 7/2009 | Agostino et al. |
| 7,590,557 B2 | 9/2009 | Harrison et al. |
| 7,631,803 B2 | 12/2009 | Peyret et al. |
| 7,650,308 B2 | 1/2010 | Nguyen et al. |
| 7,702,542 B2 | 4/2010 | Aslanian, Jr. |
| 7,711,598 B2 | 5/2010 | Perkowski |
| 7,725,326 B1 | 5/2010 | Tracy et al. |
| 7,735,724 B2 | 6/2010 | Fujita et al. |
| 7,757,944 B2 | 7/2010 | Cline et al. |
| 7,774,209 B2 | 8/2010 | James et al. |
| 7,840,437 B2 | 11/2010 | Lewis |
| 7,848,948 B2 | 12/2010 | Perkowski et al. |
| 7,866,548 B2 | 1/2011 | Reed et al. |
| 7,904,333 B1 | 3/2011 | Perkowski |
| 7,905,399 B2 | 3/2011 | Barnes et al. |
| 7,917,386 B2 | 3/2011 | Christensen |
| 7,940,333 B2 | 5/2011 | Suzuki |
| 7,941,373 B1 | 5/2011 | Chang et al. |
| 7,959,076 B1 | 6/2011 | Hopkins, III |
| 8,046,268 B2 | 10/2011 | Hunt |
| 8,060,413 B2 | 11/2011 | Castell et al. |
| 8,103,520 B2 | 1/2012 | Mueller et al. |
| 8,109,436 B1 | 2/2012 | Hopkins, III |

(56) References Cited

U.S. PATENT DOCUMENTS

| | | |
|---|---|---|
| 8,195,568 B2 | 6/2012 | Singhal |
| 8,332,323 B2 | 12/2012 | Stals et al. |
| 8,355,982 B2 | 1/2013 | Hazel et al. |
| 8,396,758 B2 | 3/2013 | Paradise et al. |
| 8,443,967 B2 * | 5/2013 | Glass .................. B42F 7/02 206/39 |
| 8,509,814 B1 | 8/2013 | Parker |
| 8,577,735 B2 | 11/2013 | Wilen et al. |
| 8,636,203 B1 | 1/2014 | Patterson et al. |
| 8,662,387 B1 | 3/2014 | Geller et al. |
| 8,751,298 B1 | 6/2014 | Giordano et al. |
| 8,768,834 B2 | 7/2014 | Zacarias et al. |
| 8,950,656 B2 * | 2/2015 | Nebeker ............... B65D 5/322 220/62 |
| 9,098,190 B2 | 8/2015 | Zhou et al. |
| 9,483,786 B2 | 11/2016 | Glass et al. |
| 9,672,687 B2 | 6/2017 | Cage et al. |
| 2001/0001321 A1 | 5/2001 | Resnick et al. |
| 2001/0001856 A1 | 5/2001 | Gould et al. |
| 2001/0005840 A1 | 6/2001 | Verkama |
| 2001/0007983 A1 | 7/2001 | Lee |
| 2001/0011248 A1 | 8/2001 | Himmel et al. |
| 2001/0032878 A1 | 10/2001 | Tsiounis et al. |
| 2001/0034707 A1 | 10/2001 | Sakaguchi |
| 2001/0037264 A1 | 11/2001 | Husemann et al. |
| 2001/0042784 A1 | 11/2001 | Fite et al. |
| 2001/0044776 A1 | 11/2001 | Kight et al. |
| 2001/0056410 A1 | 12/2001 | Ishigaki |
| 2002/0002535 A1 | 1/2002 | Kitchen et al. |
| 2002/0010627 A1 | 1/2002 | Lerat |
| 2002/0010677 A1 | 1/2002 | Kitchen et al. |
| 2002/0013768 A1 | 1/2002 | Ganesan |
| 2002/0019809 A1 | 2/2002 | Kitchen et al. |
| 2002/0022472 A1 | 2/2002 | Watler et al. |
| 2002/0046165 A1 | 4/2002 | Kitchen et al. |
| 2002/0046166 A1 | 4/2002 | Kitchen et al. |
| 2002/0046167 A1 | 4/2002 | Kitchen et al. |
| 2002/0046168 A1 | 4/2002 | Kitchen et al. |
| 2002/0049672 A1 | 4/2002 | Kitchen et al. |
| 2002/0052840 A1 | 5/2002 | Kitchen et al. |
| 2002/0052841 A1 | 5/2002 | Guthrie et al. |
| 2002/0060243 A1 | 5/2002 | Janiak et al. |
| 2002/0062249 A1 | 5/2002 | Iannacci |
| 2002/0062282 A1 | 5/2002 | Kight et al. |
| 2002/0065713 A1 | 5/2002 | Awada et al. |
| 2002/0065773 A1 | 5/2002 | Kight et al. |
| 2002/0065774 A1 | 5/2002 | Young et al. |
| 2002/0077076 A1 | 6/2002 | Suryanarayana et al. |
| 2002/0077993 A1 | 6/2002 | Immonen et al. |
| 2002/0088855 A1 | 7/2002 | Hodes |
| 2002/0091573 A1 | 7/2002 | Hodes |
| 2002/0101966 A1 | 8/2002 | Nelson |
| 2002/0107791 A1 | 8/2002 | Nobrega et al. |
| 2002/0111906 A1 | 8/2002 | Garrison et al. |
| 2002/0115424 A1 | 8/2002 | Bagoren et al. |
| 2002/0116329 A1 | 8/2002 | Serbetcioglu et al. |
| 2002/0119767 A1 | 8/2002 | Fieldhouse et al. |
| 2002/0120571 A1 | 8/2002 | Maung et al. |
| 2002/0128968 A1 | 9/2002 | Kitchen et al. |
| 2002/0138450 A1 | 9/2002 | Kremer |
| 2002/0138573 A1 | 9/2002 | Saguy |
| 2002/0152123 A1 | 10/2002 | Giordano et al. |
| 2002/0152160 A1 | 10/2002 | Allen-Rouman et al. |
| 2002/0152179 A1 | 10/2002 | Racov |
| 2002/0153414 A1 | 10/2002 | Stoutenburg et al. |
| 2002/0161631 A1 | 10/2002 | Banerjee et al. |
| 2002/0169713 A1 | 11/2002 | Chang et al. |
| 2002/0178062 A1 | 11/2002 | Wright et al. |
| 2002/0190123 A1 | 12/2002 | Anvekar et al. |
| 2002/0198722 A1 | 12/2002 | Yuschik |
| 2003/0001005 A1 | 1/2003 | Risafi et al. |
| 2003/0004802 A1 | 1/2003 | Callegari |
| 2003/0004891 A1 | 1/2003 | Rensburg et al. |
| 2003/0004894 A1 | 1/2003 | Rowney et al. |
| 2003/0009382 A1 | 1/2003 | D'Arbeloff et al. |
| 2003/0023552 A1 | 1/2003 | Kight et al. |
| 2003/0028481 A1 | 2/2003 | Flitcroft et al. |
| 2003/0033246 A1 | 2/2003 | Slater |
| 2003/0055735 A1 | 3/2003 | Cameron et al. |
| 2003/0055782 A1 | 3/2003 | Slater |
| 2003/0070080 A1 | 4/2003 | Rosen |
| 2003/0074328 A1 | 4/2003 | Schiff et al. |
| 2003/0093366 A1 | 5/2003 | Halper et al. |
| 2003/0105672 A1 | 6/2003 | Epstein et al. |
| 2003/0105688 A1 | 6/2003 | Brown et al. |
| 2003/0115126 A1 | 6/2003 | Pitroda |
| 2003/0121967 A1 | 7/2003 | Goldberg et al. |
| 2003/0126079 A1 | 7/2003 | Roberson et al. |
| 2003/0141358 A1 | 7/2003 | Hudson et al. |
| 2003/0162565 A1 | 8/2003 | Al-Khaja |
| 2003/0163787 A1 | 8/2003 | Hay et al. |
| 2003/0172039 A1 | 9/2003 | Guy et al. |
| 2003/0191711 A1 | 10/2003 | Jamison et al. |
| 2003/0197059 A1 | 10/2003 | Tidball et al. |
| 2003/0200179 A1 | 10/2003 | Kwan |
| 2003/0200184 A1 | 10/2003 | Dominguez et al. |
| 2003/0212601 A1 | 11/2003 | Silva et al. |
| 2003/0218062 A1 | 11/2003 | Noriega et al. |
| 2003/0218066 A1 | 11/2003 | Fernandes et al. |
| 2003/0220884 A1 | 11/2003 | Choi et al. |
| 2003/0226042 A1 | 12/2003 | Fukushima |
| 2003/0229590 A1 | 12/2003 | Byrne et al. |
| 2003/0233317 A1 | 12/2003 | Judd |
| 2003/0233318 A1 | 12/2003 | King et al. |
| 2003/0234819 A1 | 12/2003 | Daly et al. |
| 2003/0236704 A1 | 12/2003 | Antonucci |
| 2004/0009760 A1 | 1/2004 | Laybourn et al. |
| 2004/0010462 A1 | 1/2004 | Moon et al. |
| 2004/0019564 A1 | 1/2004 | Goldthwaite et al. |
| 2004/0019568 A1 | 1/2004 | Moenickheim et al. |
| 2004/0029569 A1 | 2/2004 | Khan et al. |
| 2004/0046035 A1 | 3/2004 | Davila et al. |
| 2004/0049456 A1 | 3/2004 | Dreyer |
| 2004/0049458 A1 | 3/2004 | Kunugi et al. |
| 2004/0054587 A1 | 3/2004 | Dev et al. |
| 2004/0059671 A1 | 3/2004 | Nozaki et al. |
| 2004/0064409 A1 | 4/2004 | Kight et al. |
| 2004/0068446 A1 | 4/2004 | Do et al. |
| 2004/0068448 A1 | 4/2004 | Kim |
| 2004/0078327 A1 | 4/2004 | Frazier et al. |
| 2004/0078332 A1 | 4/2004 | Ferguson et al. |
| 2004/0083170 A1 | 4/2004 | Bam et al. |
| 2004/0083171 A1 | 4/2004 | Kight et al. |
| 2004/0093305 A1 | 5/2004 | Kight et al. |
| 2004/0094624 A1 | 5/2004 | Fernandes et al. |
| 2004/0107170 A1 | 6/2004 | Labrou et al. |
| 2004/0114766 A1 | 6/2004 | Hileman et al. |
| 2004/0117302 A1 | 6/2004 | Weichert et al. |
| 2004/0118914 A1 | 6/2004 | Smith et al. |
| 2004/0128197 A1 | 7/2004 | Bam et al. |
| 2004/0139005 A1 | 7/2004 | Ganesan |
| 2004/0159700 A1 | 8/2004 | Khan et al. |
| 2004/0162058 A1 | 8/2004 | Mottes |
| 2004/0167853 A1 | 8/2004 | Sharma |
| 2004/0181463 A1 | 9/2004 | Goldthwaite et al. |
| 2004/0185881 A1 | 9/2004 | Lee et al. |
| 2004/0199431 A1 | 10/2004 | Ganesan et al. |
| 2004/0199474 A1 | 10/2004 | Ritter |
| 2004/0205023 A1 | 10/2004 | Hafer et al. |
| 2004/0205138 A1 | 10/2004 | Friedman et al. |
| 2004/0210449 A1 | 10/2004 | Breck et al. |
| 2004/0215560 A1 | 10/2004 | Amalraj et al. |
| 2004/0215564 A1 | 10/2004 | Lawlor et al. |
| 2004/0215573 A1 | 10/2004 | Teutenberg et al. |
| 2004/0224660 A1 | 11/2004 | Anderson |
| 2004/0225560 A1 | 11/2004 | Lewis et al. |
| 2004/0230489 A1 | 11/2004 | Goldthwaite et al. |
| 2004/0232225 A1 | 11/2004 | Bishop et al. |
| 2004/0242208 A1 | 12/2004 | Teicher |
| 2004/0243490 A1 | 12/2004 | Murto et al. |
| 2004/0249710 A1 | 12/2004 | Smith et al. |
| 2004/0249766 A1 | 12/2004 | Ganesan et al. |
| 2004/0267663 A1 | 12/2004 | Karns et al. |
| 2004/0267664 A1 | 12/2004 | Nam et al. |

(56) References Cited

U.S. PATENT DOCUMENTS

| | | |
|---|---|---|
| 2004/0267665 A1 | 12/2004 | Nam et al. |
| 2005/0001027 A1 | 1/2005 | Bahar |
| 2005/0015388 A1 | 1/2005 | Dasgupta et al. |
| 2005/0021457 A1 | 1/2005 | Johnson et al. |
| 2005/0027624 A1 | 2/2005 | Cai |
| 2005/0027655 A1 | 2/2005 | Sharma et al. |
| 2005/0033645 A1 | 2/2005 | DuPhily |
| 2005/0051619 A1 | 3/2005 | Graves et al. |
| 2005/0060261 A1 | 3/2005 | Remington et al. |
| 2005/0061872 A1 | 3/2005 | Paschini et al. |
| 2005/0065876 A1 | 3/2005 | Kumar |
| 2005/0071179 A1 | 3/2005 | Peters et al. |
| 2005/0071269 A1 | 3/2005 | Peters |
| 2005/0075958 A1 | 4/2005 | Gonzalez |
| 2005/0075975 A1 | 4/2005 | Rosner et al. |
| 2005/0079863 A1 | 4/2005 | Macaluso |
| 2005/0080634 A1 | 4/2005 | Kanniainen et al. |
| 2005/0080727 A1 | 4/2005 | Postrel |
| 2005/0086164 A1 | 4/2005 | Kim et al. |
| 2005/0086168 A1 | 4/2005 | Alvarez et al. |
| 2005/0096981 A1 | 5/2005 | Shimada |
| 2005/0097038 A1 | 5/2005 | Yu et al. |
| 2005/0103839 A1 | 5/2005 | Hewel |
| 2005/0107068 A1 | 5/2005 | Smith et al. |
| 2005/0109835 A1 | 5/2005 | Jacoby et al. |
| 2005/0116028 A1 | 6/2005 | Cohen et al. |
| 2005/0125343 A1 | 6/2005 | Mendelovich |
| 2005/0125348 A1 | 6/2005 | Fulton et al. |
| 2005/0127169 A1 | 6/2005 | Foss |
| 2005/0137978 A1 | 6/2005 | Ganesan et al. |
| 2005/0143051 A1 | 6/2005 | Park |
| 2005/0154644 A1 | 7/2005 | Deakin et al. |
| 2005/0174975 A1 | 8/2005 | Mgrdechian et al. |
| 2005/0177437 A1 | 8/2005 | Ferrier |
| 2005/0177517 A1 | 8/2005 | Leung et al. |
| 2005/0182714 A1 | 8/2005 | Nel |
| 2005/0182720 A1 | 8/2005 | Willard et al. |
| 2005/0184145 A1 | 8/2005 | Law et al. |
| 2005/0187873 A1 | 8/2005 | Labrou et al. |
| 2005/0199709 A1 | 9/2005 | Linlor |
| 2005/0203835 A1 | 9/2005 | Nhaissi et al. |
| 2005/0203844 A1 | 9/2005 | Ferguson et al. |
| 2005/0209965 A1 | 9/2005 | Ganesan |
| 2005/0222925 A1 | 10/2005 | Jamieson |
| 2005/0222961 A1 | 10/2005 | Staib et al. |
| 2005/0228717 A1 | 10/2005 | Gusler et al. |
| 2005/0247777 A1 | 11/2005 | Pitroda |
| 2005/0259589 A1 | 11/2005 | Rozmovits et al. |
| 2005/0261968 A1 | 11/2005 | Randall et al. |
| 2005/0262017 A1 | 11/2005 | Kawase et al. |
| 2005/0269401 A1 | 12/2005 | Spitzer et al. |
| 2005/0269402 A1 | 12/2005 | Spitzer et al. |
| 2005/0274793 A1 | 12/2005 | Cantini et al. |
| 2006/0000900 A1 | 1/2006 | Fernandes et al. |
| 2006/0004631 A1 | 1/2006 | Roberts et al. |
| 2006/0004656 A1 | 1/2006 | Lee |
| 2006/0006226 A1 | 1/2006 | Fitzgerald et al. |
| 2006/0023856 A1 | 2/2006 | Welton |
| 2006/0026070 A1 | 2/2006 | Sun |
| 2006/0037835 A1 | 2/2006 | Doran et al. |
| 2006/0041470 A1 | 2/2006 | Filho et al. |
| 2006/0053056 A1 | 3/2006 | Alspach-Goss et al. |
| 2006/0058011 A1 | 3/2006 | Vanska et al. |
| 2006/0074767 A1 | 4/2006 | Fortney et al. |
| 2006/0080232 A1 | 4/2006 | Epps |
| 2006/0085310 A1 | 4/2006 | Mylet et al. |
| 2006/0089160 A1 | 4/2006 | Othmer |
| 2006/0089893 A1 | 4/2006 | Joseph et al. |
| 2006/0113376 A1 | 6/2006 | Reed et al. |
| 2006/0116892 A1 | 6/2006 | Grimes et al. |
| 2006/0136334 A1 | 6/2006 | Atkinson et al. |
| 2006/0136901 A1 | 6/2006 | Nichols |
| 2006/0161490 A1 | 7/2006 | Chakiris et al. |
| 2006/0163343 A1 | 7/2006 | Changryeol |
| 2006/0167744 A1 | 7/2006 | Yoo |
| 2006/0206436 A1 | 9/2006 | James et al. |
| 2006/0207856 A1 | 9/2006 | Dean et al. |
| 2006/0231609 A1* | 10/2006 | Lazarowicz ............ G06Q 20/10 235/380 |
| 2006/0235754 A1 | 10/2006 | Walker et al. |
| 2006/0253320 A1 | 11/2006 | Heywood |
| 2006/0255125 A1 | 11/2006 | Jennings et al. |
| 2007/0017976 A1 | 1/2007 | Peyret et al. |
| 2007/0021969 A1 | 1/2007 | Homeier-Beals |
| 2007/0030824 A1 | 2/2007 | Ribaudo et al. |
| 2007/0038577 A1 | 2/2007 | Werner et al. |
| 2007/0043682 A1 | 2/2007 | Drapkin et al. |
| 2007/0055785 A1 | 3/2007 | Stevens |
| 2007/0063024 A1 | 3/2007 | Guillot |
| 2007/0091901 A1* | 4/2007 | Grand ..................... H04L 29/06 370/395.52 |
| 2007/0100761 A1 | 5/2007 | Dillon |
| 2007/0108269 A1 | 5/2007 | Benco et al. |
| 2007/0114274 A1 | 5/2007 | Gibbs et al. |
| 2007/0118478 A1 | 5/2007 | Graves et al. |
| 2007/0125838 A1 | 6/2007 | Law et al. |
| 2007/0130085 A1 | 6/2007 | Zhu |
| 2007/0156436 A1 | 7/2007 | Fisher et al. |
| 2007/0162337 A1 | 7/2007 | Hawkins et al. |
| 2007/0175984 A1 | 8/2007 | Khandaker et al. |
| 2007/0192182 A1 | 8/2007 | Monaco et al. |
| 2007/0198347 A1 | 8/2007 | Muldoon |
| 2007/0208618 A1 | 9/2007 | Paintin et al. |
| 2007/0233615 A1 | 10/2007 | Tumminaro |
| 2007/0257767 A1 | 11/2007 | Beeson |
| 2007/0262140 A1 | 11/2007 | Long |
| 2007/0265872 A1 | 11/2007 | Robinson et al. |
| 2007/0284434 A1 | 12/2007 | Fletcher |
| 2008/0006685 A1 | 1/2008 | Rackley, III et al. |
| 2008/0010190 A1 | 1/2008 | Rackley, III et al. |
| 2008/0010191 A1 | 1/2008 | Rackley, III et al. |
| 2008/0010192 A1 | 1/2008 | Rackley, III et al. |
| 2008/0010193 A1 | 1/2008 | Rackley, III et al. |
| 2008/0010196 A1 | 1/2008 | Rackley, III et al. |
| 2008/0010204 A1 | 1/2008 | Rackley, III et al. |
| 2008/0010215 A1 | 1/2008 | Rackley, III et al. |
| 2008/0028395 A1 | 1/2008 | Motta et al. |
| 2008/0033817 A1 | 2/2008 | Billmaier et al. |
| 2008/0040265 A1 | 2/2008 | Rackley, III et al. |
| 2008/0041938 A1 | 2/2008 | Wise |
| 2008/0046366 A1 | 2/2008 | Bemmel et al. |
| 2008/0052164 A1 | 2/2008 | Abifaker |
| 2008/0052169 A1 | 2/2008 | O'Shea et al. |
| 2008/0059318 A1 | 3/2008 | Packes et al. |
| 2008/0070690 A1 | 3/2008 | Luchene et al. |
| 2008/0071620 A1 | 3/2008 | Lowe |
| 2008/0078831 A1 | 4/2008 | Johnson et al. |
| 2008/0091545 A1 | 4/2008 | Jennings et al. |
| 2008/0097844 A1 | 4/2008 | Hsu et al. |
| 2008/0097851 A1 | 4/2008 | Bemmel et al. |
| 2008/0103972 A1 | 5/2008 | Lanc |
| 2008/0114699 A1 | 5/2008 | Yuan et al. |
| 2008/0126145 A1 | 5/2008 | Rackley, III et al. |
| 2008/0133351 A1 | 6/2008 | White et al. |
| 2008/0172306 A1 | 7/2008 | Schorr et al. |
| 2008/0172331 A1 | 7/2008 | Graves et al. |
| 2008/0179395 A1 | 7/2008 | Dixon et al. |
| 2008/0228597 A1 | 9/2008 | Sondles |
| 2008/0235095 A1 | 9/2008 | Oles et al. |
| 2008/0255942 A1 | 10/2008 | Craft |
| 2008/0273630 A1 | 11/2008 | Mege et al. |
| 2008/0290987 A1 | 11/2008 | Li |
| 2008/0319868 A1 | 12/2008 | Briscoe et al. |
| 2009/0001159 A1 | 1/2009 | James et al. |
| 2009/0006116 A1 | 1/2009 | Baker et al. |
| 2009/0030789 A1 | 1/2009 | Mashinsky |
| 2009/0037326 A1 | 2/2009 | Chitti et al. |
| 2009/0055296 A1 | 2/2009 | Nelsen |
| 2009/0076896 A1 | 3/2009 | DeWitt et al. |
| 2009/0106115 A1 | 4/2009 | James et al. |
| 2009/0107862 A1* | 4/2009 | Pascua .................. B65D 75/14 206/232 |
| 2009/0111378 A1 | 4/2009 | Sheynman et al. |
| 2009/0112709 A1 | 4/2009 | Barhydt et al. |

(56) References Cited

U.S. PATENT DOCUMENTS

| | | |
|---|---|---|
| 2009/0144161 A1 | 6/2009 | Fisher |
| 2009/0157554 A1 | 6/2009 | Hobson et al. |
| 2009/0164329 A1 | 6/2009 | Bishop et al. |
| 2009/0171739 A1 | 7/2009 | De et al. |
| 2009/0171804 A1 | 7/2009 | Lee et al. |
| 2009/0173782 A1 | 7/2009 | Muscato |
| 2009/0173784 A1 | 7/2009 | Yang |
| 2009/0187491 A1 | 7/2009 | Bull et al. |
| 2009/0192904 A1 | 7/2009 | Patterson et al. |
| 2009/0192928 A1 | 7/2009 | Abifaker |
| 2009/0247131 A1 | 10/2009 | Champion et al. |
| 2009/0254453 A1 | 10/2009 | Sanguinetti et al. |
| 2009/0281915 A1 | 11/2009 | Deakin et al. |
| 2009/0281941 A1 | 11/2009 | Worth |
| 2009/0281951 A1 | 11/2009 | Shakkarwar |
| 2009/0287558 A1 | 11/2009 | Seth et al. |
| 2009/0298427 A1 | 12/2009 | Wilkinson et al. |
| 2009/0327121 A1 | 12/2009 | Carroll et al. |
| 2010/0005025 A1 | 1/2010 | Kumar et al. |
| 2010/0008535 A1 | 1/2010 | Abulafia et al. |
| 2010/0010906 A1 | 1/2010 | Grecia |
| 2010/0041368 A1 | 2/2010 | Kumar |
| 2010/0042471 A1 | 2/2010 | Chang et al. |
| 2010/0063906 A1 | 3/2010 | Nelsen et al. |
| 2010/0076833 A1 | 3/2010 | Nelsen |
| 2010/0082487 A1 | 4/2010 | Nelsen |
| 2010/0082490 A1 | 4/2010 | Rosenblatt et al. |
| 2010/0088188 A1 | 4/2010 | Kumar et al. |
| 2010/0097180 A1 | 4/2010 | Cardullo |
| 2010/0130172 A1 | 5/2010 | Vendrow et al. |
| 2010/0131415 A1 | 5/2010 | Sartipi |
| 2010/0174993 A1 | 7/2010 | Pennington et al. |
| 2010/0175287 A1 | 7/2010 | Gupta et al. |
| 2010/0185505 A1 | 7/2010 | Sprogoe et al. |
| 2010/0205063 A1 | 8/2010 | Mersky |
| 2010/0280921 A1 | 11/2010 | Stone et al. |
| 2010/0293536 A1 | 11/2010 | Nikitin et al. |
| 2010/0299194 A1 | 11/2010 | Snyder et al. |
| 2010/0299266 A1 | 11/2010 | Catania et al. |
| 2010/0304852 A1 | 12/2010 | Szrek et al. |
| 2011/0087592 A1 | 4/2011 | Veen et al. |
| 2011/0091092 A1 | 4/2011 | Nepomniachtchi et al. |
| 2011/0106698 A1 | 5/2011 | Isaacson et al. |
| 2011/0125607 A1 | 5/2011 | Wilen |
| 2011/0145044 A1 | 6/2011 | Nelsen et al. |
| 2011/0161226 A1 | 6/2011 | Courtion et al. |
| 2011/0173083 A1 | 7/2011 | Reed et al. |
| 2011/0202419 A1 | 8/2011 | Mamdani et al. |
| 2011/0234514 A1 | 9/2011 | Gothard |
| 2011/0246284 A1 | 10/2011 | Chaikin et al. |
| 2011/0251962 A1 | 10/2011 | Hruska |
| 2012/0004769 A1 | 1/2012 | Hallenbeck et al. |
| 2012/0099780 A1 | 4/2012 | Smith et al. |
| 2012/0136780 A1 | 5/2012 | El-Awady et al. |
| 2012/0203572 A1 | 8/2012 | Christensen |
| 2012/0205281 A1* | 8/2012 | Glass .................... B42D 15/08 |
| | | 206/556 |
| 2012/0209688 A1 | 8/2012 | Lamothe et al. |
| 2012/0234911 A1 | 9/2012 | Yankovich et al. |
| 2012/0271689 A1 | 10/2012 | Etheredge et al. |
| 2012/0284185 A1 | 11/2012 | Mettler et al. |
| 2013/0073388 A1 | 3/2013 | Heath |
| 2013/0290121 A1 | 10/2013 | Simakov et al. |
| 2013/0304561 A1 | 11/2013 | Warner et al. |
| 2014/0006268 A1 | 1/2014 | Roberts et al. |
| 2014/0019238 A1 | 1/2014 | Blatchley et al. |
| 2015/0278845 A1 | 10/2015 | Sorem et al. |
| 2017/0076293 A1 | 3/2017 | Cage et al. |

FOREIGN PATENT DOCUMENTS

| | | |
|---|---|---|
| EP | 2128809 A1 | 12/2009 |
| JP | 2002189963 A | 7/2002 |
| JP | 2002318951 A | 10/2002 |
| JP | 2003208541 A | 7/2003 |
| KR | 20010106187 A | 11/2001 |
| KR | 20040028487 A | 4/2004 |
| KR | 20040052531 A | 6/2004 |
| KR | 1020040052502 | 6/2004 |
| KR | 20040069294 A | 8/2004 |
| KR | 20050118609 A | 12/2005 |
| KR | 20090123444 A | 12/2009 |
| WO | 2004012118 A1 | 2/2004 |
| WO | 2005111882 A1 | 11/2005 |
| WO | 2008005018 A9 | 1/2010 |
| WO | 2013078499 A1 | 6/2013 |

OTHER PUBLICATIONS

International Search Report of PCT/US 13/23945, dated Mar. 29, 2013; 2 pages.

ISA European Patent Office, Search Report of EP09812328.4, dated Jul. 4, 2012, Germany, 6 pages.

ISA Korea, International Search Report of PCT/US2009/056118, dated Apr. 19, 2010, 3 pages.

ISA Korea, International Search Report of PCT/US2009/058111, dated May 26, 2010, 3 pages.

ISA Korean Intellectual Property Office, International Search Report of PCT/US2010/060875, dated Jul. 29, 2011, 10 pages.

ISA United States Patent and Trademark Office, International Search Report of PCT/US2008/073910, dated Nov. 10, 2008.

Nelsen, David A., "Systems and Methods to Manage and Control Use of a Virtual Card," U.S. Appl. No. 13/158,349, filed Jun. 10, 2011, 62 pages.

* cited by examiner

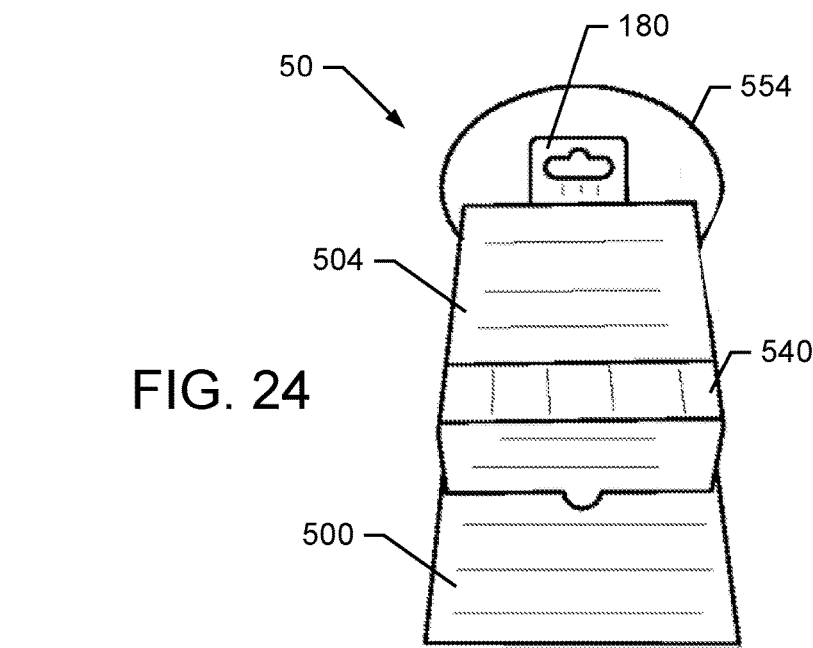
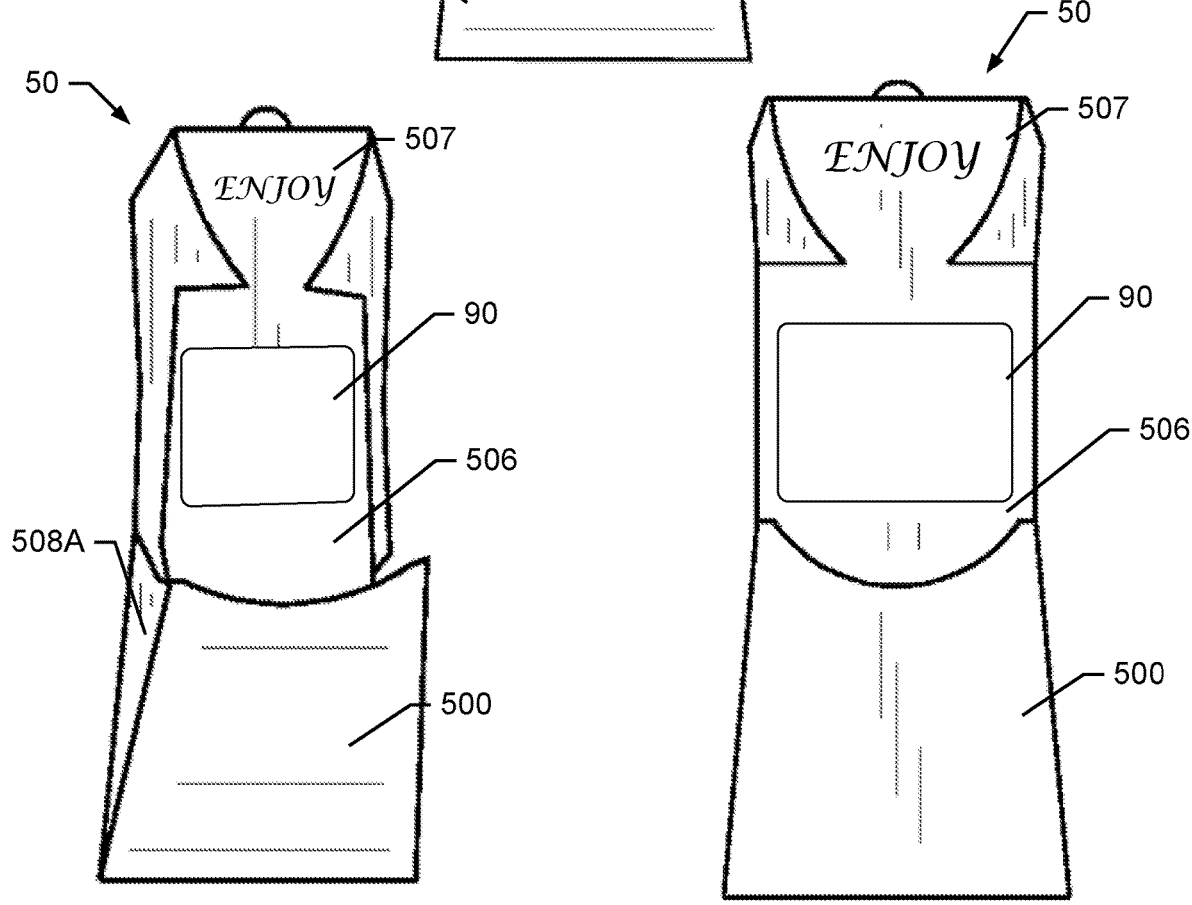
FIG. 24
FIG. 25A
FIG. 25B

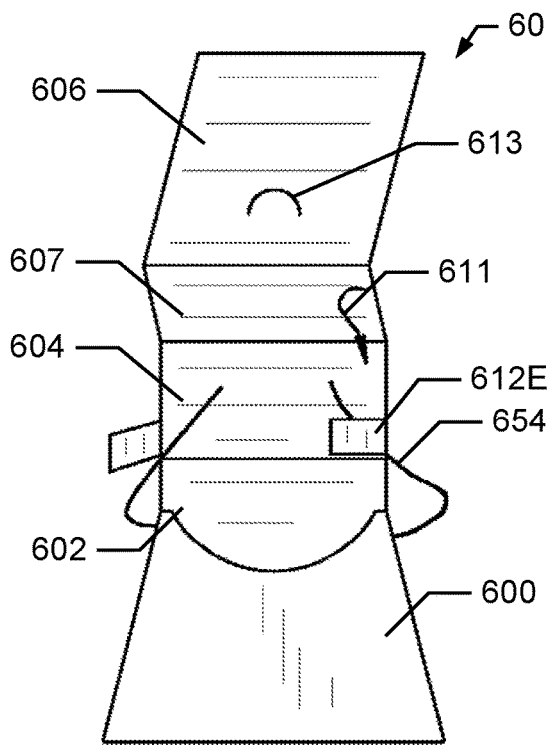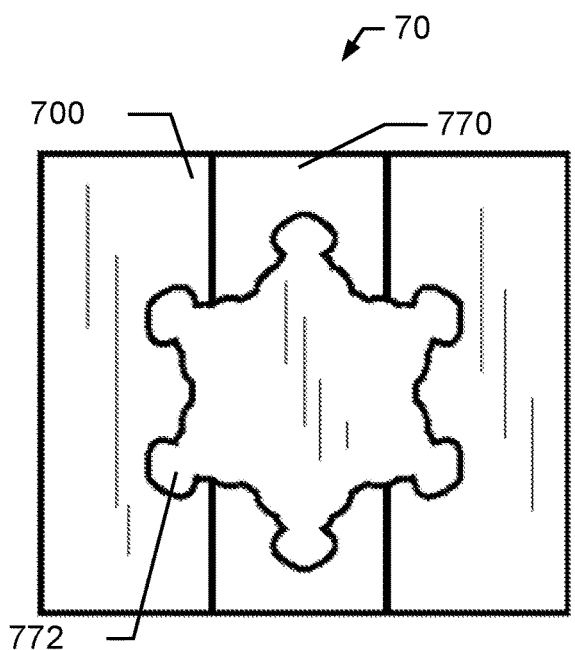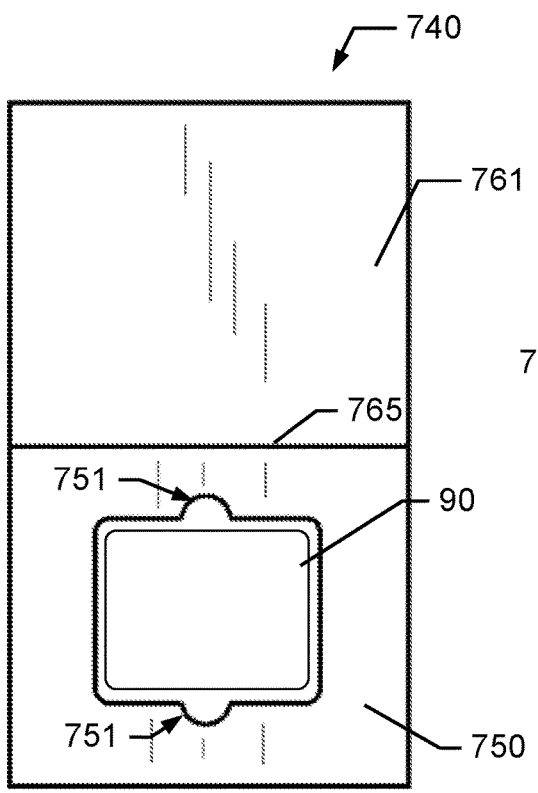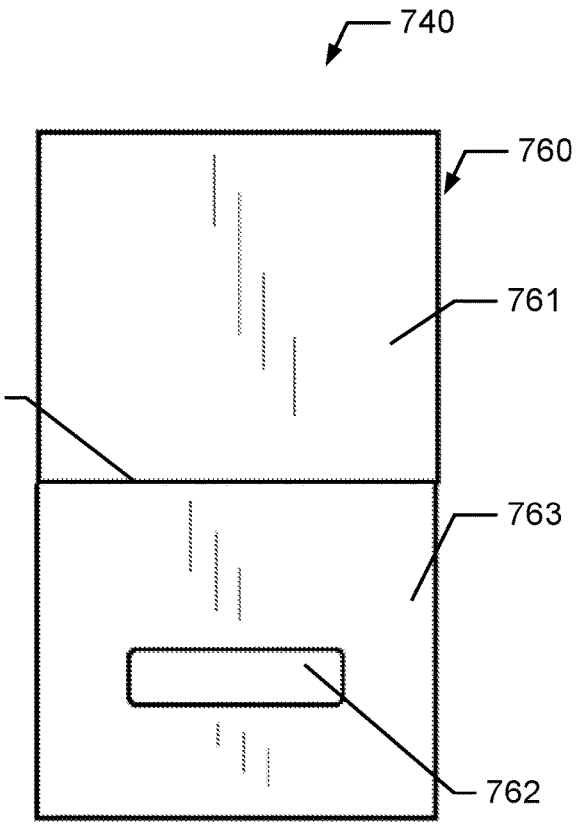

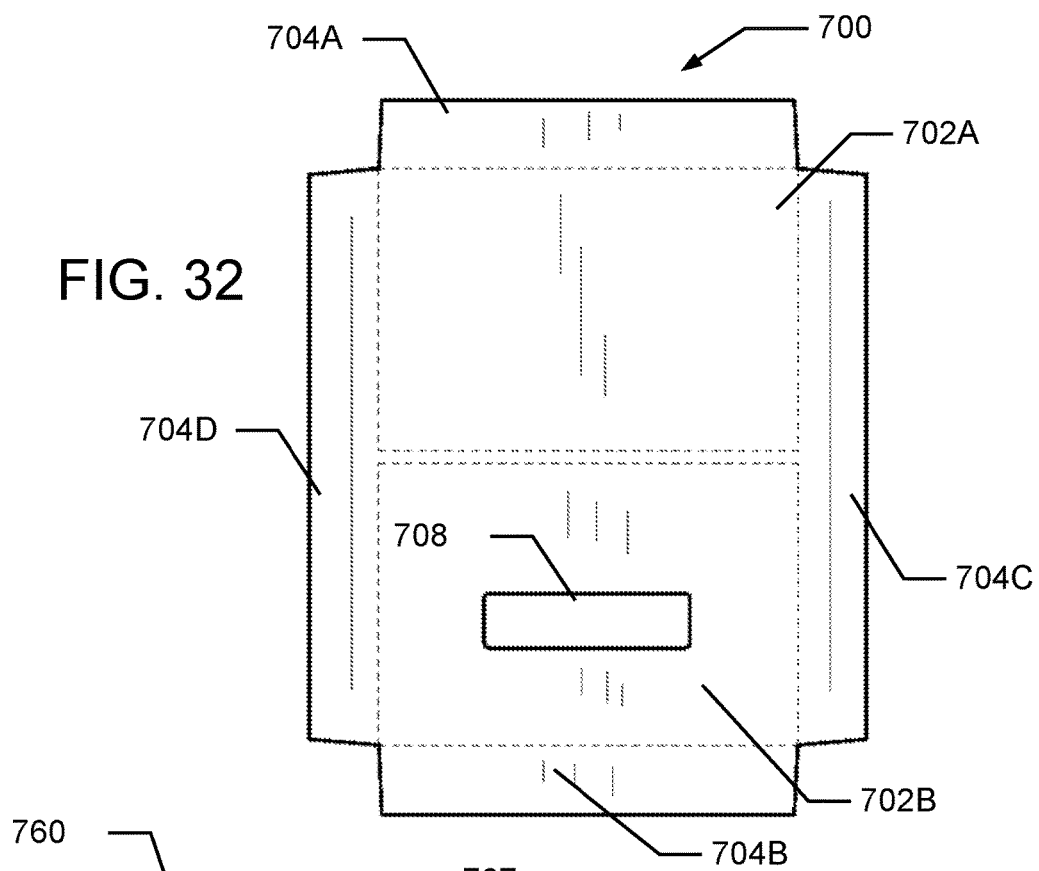
FIG. 32
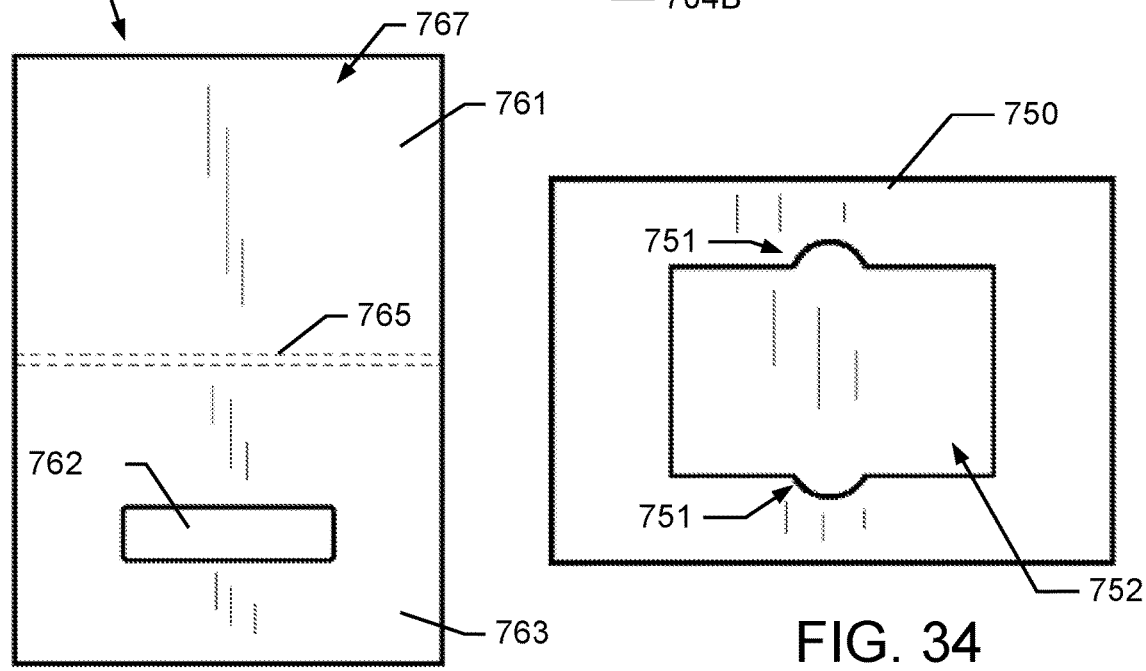
FIG. 33
FIG. 34

GIFT CARD PRESENTATION DEVICES

CROSS-REFERENCE TO RELATED APPLICATIONS

This application claims the benefit of priority to U.S. Nonprovisional application Ser. No. 14/181,668, entitled "Gift Card Presentation Devices," filed Feb. 15, 2014, which claims priority to U.S. Provisional Application No. 61/765,594, filed Feb. 15, 2013, entitled "Gift Card Presentation Devices," the entire contents of which are hereby incorporated herein by reference.

BACKGROUND

Transaction cards, stored value cards, or gift cards are popular gifts. Gift cards typically comprise a stored value card whereby a certain cash equivalent value is encoded upon a magnetic strip applied to the surface of the card. This stored value may be determined by the vendor prior to packaging and display for sale, or may be selected at the point of sale by the purchaser and loaded by the cashier using a magnetic card reader/writer. Although popular, gift cards are typically provided with a generic and impersonal design. In addition, gift cards are often given in simple un-adorned envelopes or impersonal sleeves. This may minimize the gift giving experience and emotional value for both gift giver and the recipient.

Therefore, a need exists for a gift card holder that provides graphical and/or mechanical enhancements to entertain the gift card recipient and add emotional and personal value to the gift and the gift giver.

SUMMARY

This invention relates generally to gift card holders and more particularly to a device for holding a gift card or gift card packet while providing graphical and mechanical enhancements to entertain the gift card recipient and add value to the gift giving experience for the gift giver. In addition, the gift card holders are suitable for convenient display and activation by retailers. Specifically, the gift card holders include one or more cutouts that provide easy access to view and scan a barcode or other indicia on the gift cards for activation.

In one embodiment, a gift card holder includes a pocket portion having at least one cutout, and an insert portion for receiving a gift card. The insert portion also includes at least one other cutout. The insert portion is slidably engaged to the pocket portion such that the gift card is concealed within the pocket portion when the insert is fully inserted. In addition, the cutouts of the pocket portion and the insert portion are aligned so that a barcode or other indicia on the gift card may be viewed when the card is inserted into the pocket portion. In various aspects, the pocket portion and insert may be configured and adorned to resemble a gift box or gift bag.

In another embodiment, a gift card holder includes a pocket portion having a front, a back with at least one cutout, and a flap. The holder also includes an insert portion for receiving a gift card. The insert portion includes at least one opening for receiving the gift card, at least one opening for receiving a photograph, and at least one cutout. When the insert portion is inserted into the pocket portion, the at least one cutout is aligned so that a barcode or other indicia on the gift card may be viewed when the card is inserted into the pocket portion. In one aspect, the insert portion includes an easel attachment, so that the insert portion may be used as a photo frame.

In one embodiment, the gift card holder includes a planar material that is folded to form a pocket portion and a gift card panel. The pocket portion includes a front, a back having at least one cutout, and a flap, while the gift card panel is configured to receive a gift card. The gift card panel also includes at least one cutout. The gift card panel is slidably inserted into the pocket portion such that the cutouts are aligned so that a barcode or other indicia on the gift card may be viewed when the gift card panel is inserted into the pocket portion. In one aspect, the pocket portion includes one or more gusset panels. In another aspect, the pocket portion forms a box shape.

In one embodiment, the gift card holder is a planar material folded to form a bi-fold having a top portion and a bottom portion with at least one cutout. The holder also includes a frame affixed to the bottom portion. A gift card may be received within the frame and the top portion may be folded towards the bottom portion such that a front surface of the top portion is positioned proximate to a front surface of the bottom portion when the holder is in a closed configuration. In one aspect, the holder may also include an outer sleeve that also has a cutout such that the cutouts are aligned so that a barcode or other indicia on the gift card may be viewed when the bi-fold is inserted into the sleeve. The bi-fold holder may also include a band that encircles the holder to hold it in the closed configuration.

In one embodiment, the gift card holder is a box having a bottom portion with at least one cutout and a lid portion. The box also includes a tray positioned within the bottom portion. The tray receives a gift card and includes at least one cutout. The exterior of the box is covered in one or more decorative liners that also include at least one cutout, such that all of the cutouts are aligned so that a barcode or other indicia on the gift card may be viewed when the box is closed.

In various other embodiments the pocket portion or sleeve and insert portions may be dimensioned such that they are at least twice the height and/or twice the width of a typical gift card. In addition, the insert may also include one or more pull tabs for removing the insert from the pocket portion or sleeve.

Details of one or more implementations are set forth in the accompanying drawings and the description below. Other features and advantages may be apparent from the description and drawings, and from the claims.

BRIEF DESCRIPTION OF THE DRAWINGS

FIG. 24 is a plan view of a revealing gift card holder according to one embodiment.

FIGS. 25A and 25B are a perspective view and a plan view, respectively, of a revealing gift card holder according to one embodiment.

FIG. 29 is a diagram of the assembly of a revealing gift card holder according to one embodiment.

FIG. 30 is a plan view of a bi-fold gift card holder in a closed configuration according to one embodiment.

FIGS. 31A and 31B are a front plan view and a rear plan view, respectively, of a bi-fold gift card holder in an open configuration according to one embodiment.

FIG. 32 is a plan view of an exterior surface of an outer sleeve portion of a bi-fold gift card holder according to one embodiment.

FIG. 33 is a plan view of a backer panel for a bi-fold insert portion of a bi-fold gift card holder according to one embodiment.

FIG. 34 is a plan view of a front frame portion for a bi-fold insert portion of a bi-fold gift card holder according to one embodiment.

DETAILED DESCRIPTION

Figure 1A:
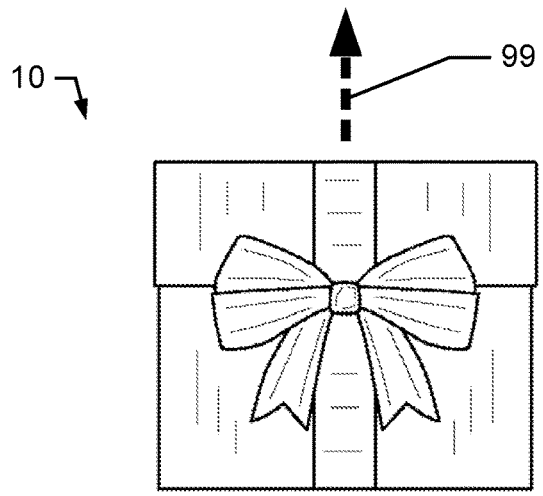
FIGS. 1A and 1B are front plan views of a simulated present gift card holder in a closed and open configuration, respectively, according to one embodiment.

The present invention relates to gift card holders that enhance the gift giving experience for both the gift giver and the gift recipient. The gift card holders disclosed herein also provide benefits to retailers. For example, the gift cards and gift card holders may be received by retailers in pre-assembled packaging. In addition, gift card holders allow the gift cards to be purchased and activated without removing them from the gift card holders. In various aspects, the gift card holders of the present invention include a number of decorative and functional features that allow a gift giver to add personalization and other enhancements when giving a gift card.

Simulated Present Gift Card Holders

FIGS. 1A-6 depict one embodiment of a simulated present gift card holder 10 having a pocket portion 100 and a removable gift card insert 150. In one aspect, the pocket portion 100 is formed by cutting and folding a generally planar material, such as but not limited to paper, cardstock, paperboard, or cardboard. The planar material has an exterior surface 101, shown in FIG. 2A, and an interior surface 103, shown in FIG. 2B. The surfaces 101 and 103 may be printed, painted, or otherwise marked with graphics or indicia. In one aspect, the planar material is cut to form two generally rectangular portions 102A-B and tabs 104A-B. The rectangular portions 102A-B and the tabs 104A-B are defined and separated by one or more folds 106A-C. The pocket portion 100 is folded along fold 106C to position the interior surface of the rectangular portion 102A proximal to and facing the interior surface of the rectangular portion 102B. An adhesive is applied to the tabs 104A-B which are then affixed to the interior surface of rectangular portion 102A, thereby forming a pocket that is open along the side opposite the tab 104B. The rectangular portion 102A includes a cutout or opening 108. The cutout 108 allows a barcode, including matrix or two-dimensional barcodes and/or other indicia, including alphanumeric text, on a gift card positioned within the pocket to be viewed and scanned without removing the gift card from the pocket portion 100. The pocket portion 100 may also include additional indicia and adornments, such as a bow 110 or indicia to identify the gift giver and recipient.

Figure 3A:
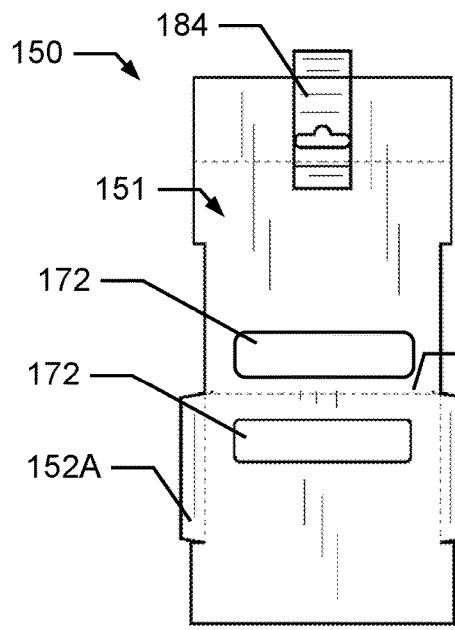
FIGS. 3A and 3B are plan views of an exterior surface and an interior surface, respectively, of an unassembled insert portion of a simulated present gift card holder according to one embodiment.
Figure 3B:
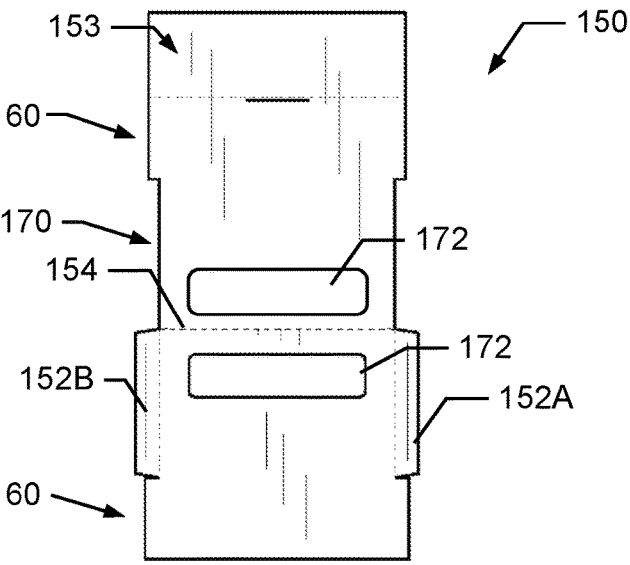

The removable gift card insert 150, shown in FIGS. 3A and 3B, is also made from a planar material that is marked with indicia on the exterior surface 151 or the interior surface 153. The insert 150 is formed by cutting and folding along fold 154 to bring the interior surfaces of the insert 150 into close proximity to each other. An adhesive is applied to the tabs 152A-B that are folded inward to hold the folded insert together.

Figure 1B:
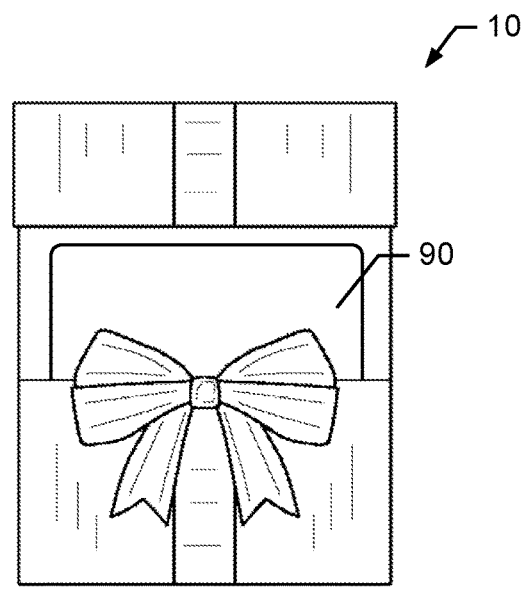
Figure 2A:
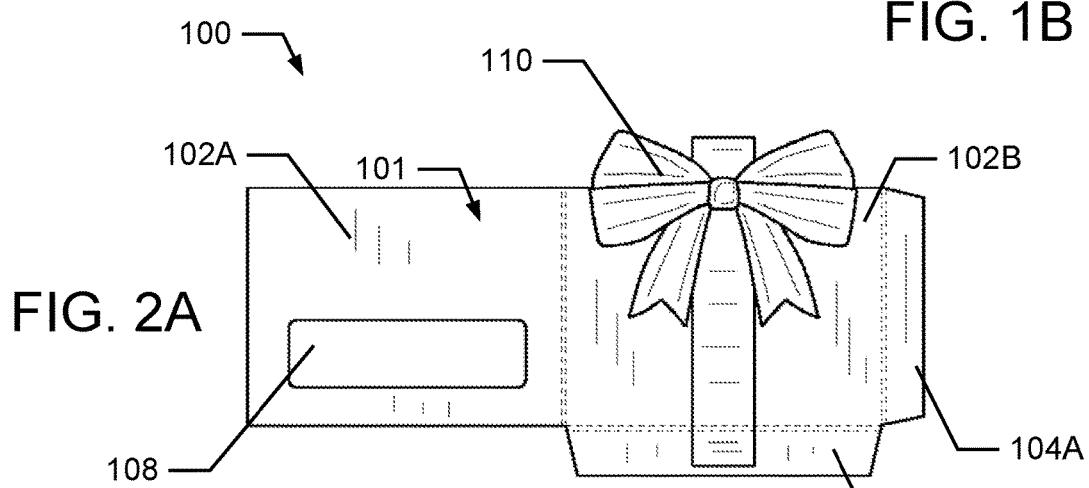
FIGS. 2A and 2B are plan views of an exterior surface and an interior surface, respectively, of an unassembled pocket portion of a simulated present gift card holder according to one embodiment.
Figure 2B:
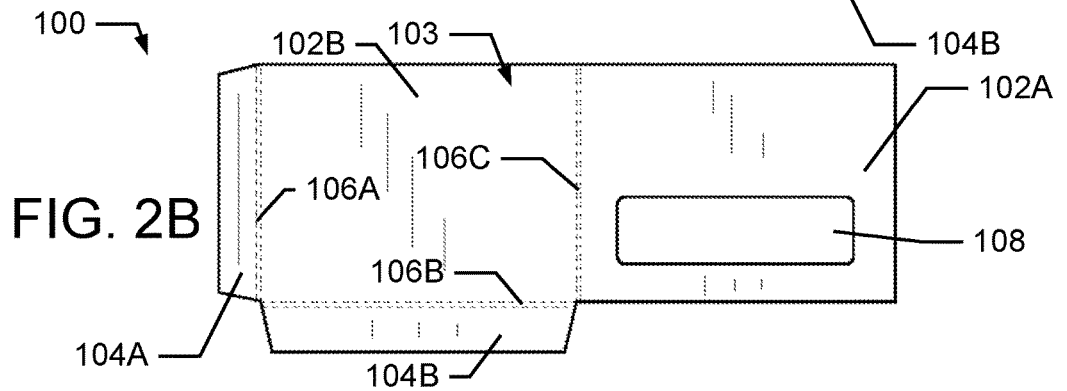

The folded planar material has a top insert portion 160 and a bottom insertion portion 170. In one aspect, the top insert portion 160 is wider than the bottom insert portion 170. Once the insert 150 is assembled, the bottom insert portion is received into the pocket portion 100, as shown in FIGS. 1A-B. Once inserted, the gift card holder 10 has the appearance of a wrapped present. Translating the insert portion 150 away from the pocket portion 100, as indicated by 99, simulates the opening of a present to reveal the gift card.

The bottom insert portion also has one or more cutouts 172 that align with the cutout 108 and allow a barcode or other indicia on a gift card attached to the insert 150 to be viewed and scanned when the insert is positioned within the pocket 100. A gift card may then be attached to the marked surface of the bottom insert portion 170. The top insert portion 160 may include additional features, including a removable tab 180 for displaying the gift card holder 10 at a retail location, a tag 182 for identifying the gift giver and recipient, and additional adornments including a ribbon 184, which may be passed through a slot cut into the top portion.

FIGS. 7A-9B depict another embodiment of a simulated present gift card holder 20 having a pocket portion 200 and a slidable gift card insert 250. In one aspect, a pocket portion 200 is formed by cutting and folding a generally planar material, such as but not limited to paper, cardstock, paperboard, or cardboard. The planar material has an exterior surface 201, shown in FIG. 8A, and an interior surface 203, shown in FIG. 8B. The surfaces 201 and 203 may be printed, painted, or otherwise marked with graphics or indicia. In one aspect, the planar material is cut to form two generally trapezoidal portions 202A-B and tabs 204A-B. The trapezoidal portions 202A-B and the tabs 204A-B are defined and separated by one or more folds 206A-C. In one aspect, the trapezoidal portions are shaped and marked to resemble a shopping bag; however, other shapes and markings may also be used. The pocket portion 200 is folded along fold 206C to position the interior surface of the trapezoidal portion 202A proximal to and facing the interior surface of the trapezoidal portion 202B. An adhesive is applied to the tabs 204A-B which are then affixed to the interior surface of trapezoidal portion 202A, thereby forming a pocket that is open along a side opposite the tab 204B. The trapezoidal portion 202A includes a cutout or opening 208. The cutout 208 allows a barcode or other indicia on a gift card positioned within the pocket to be viewed and scanned without removing the gift card from the pocket portion 200 The pocket portion 200 may also include additional indicia and adornments, such as a bow 210 or indicia to identify the gift giver and recipient.

Figures 7A, 7B:
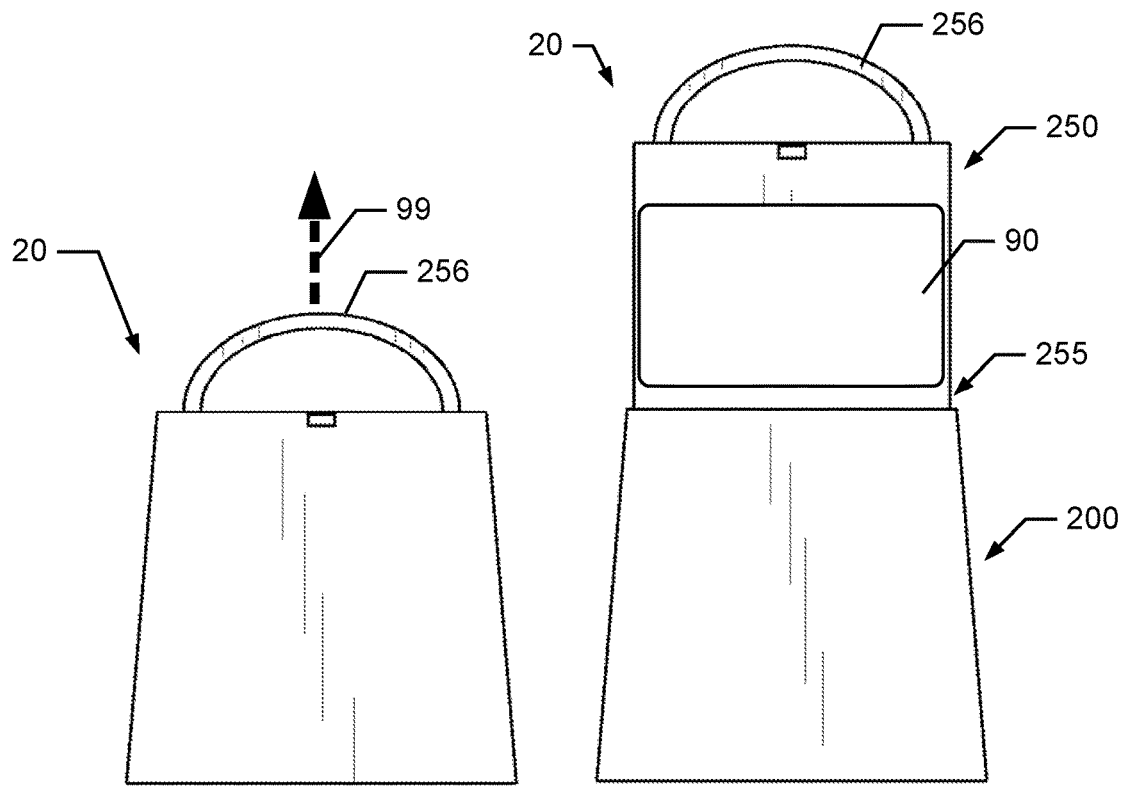
FIGS. 7A and 7B are front plan views of a simulated present gift card holder in a closed and open configuration, respectively, according to one embodiment.
Figures 8A, 8B:
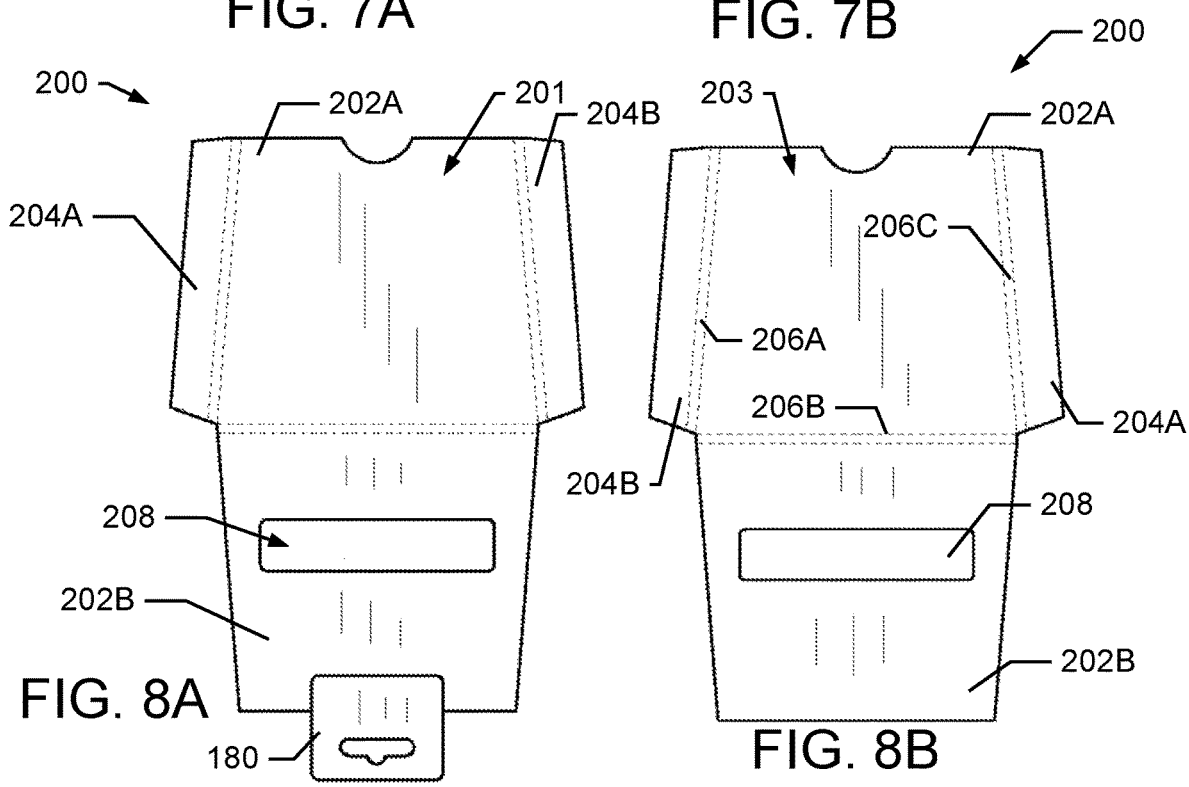
FIGS. 8A and 8B are plan views of an exterior surface and an interior surface, respectively, of an unassembled pocket portion of a simulated present gift card holder according to one embodiment.
Figures 9A, 9B:
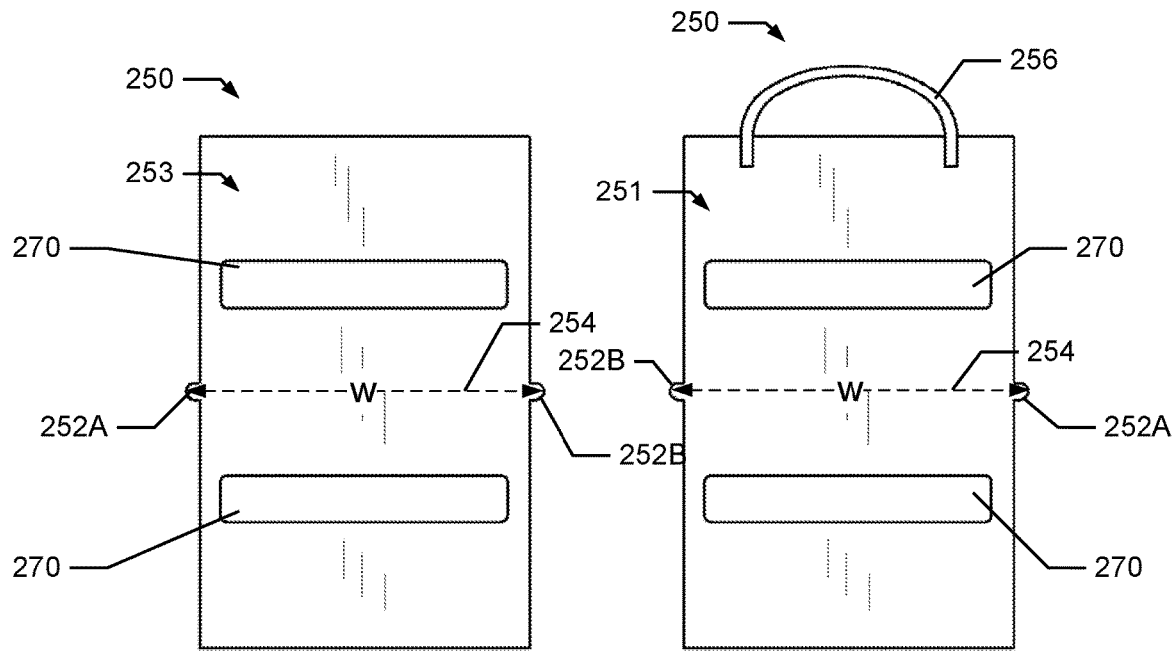
FIGS. 9A and 9B are plan views of an interior surface and an exterior surface, respectively, of an unassembled insert portion of a simulated present gift card holder according to one embodiment.
Figures 10A, 10B, 10C:
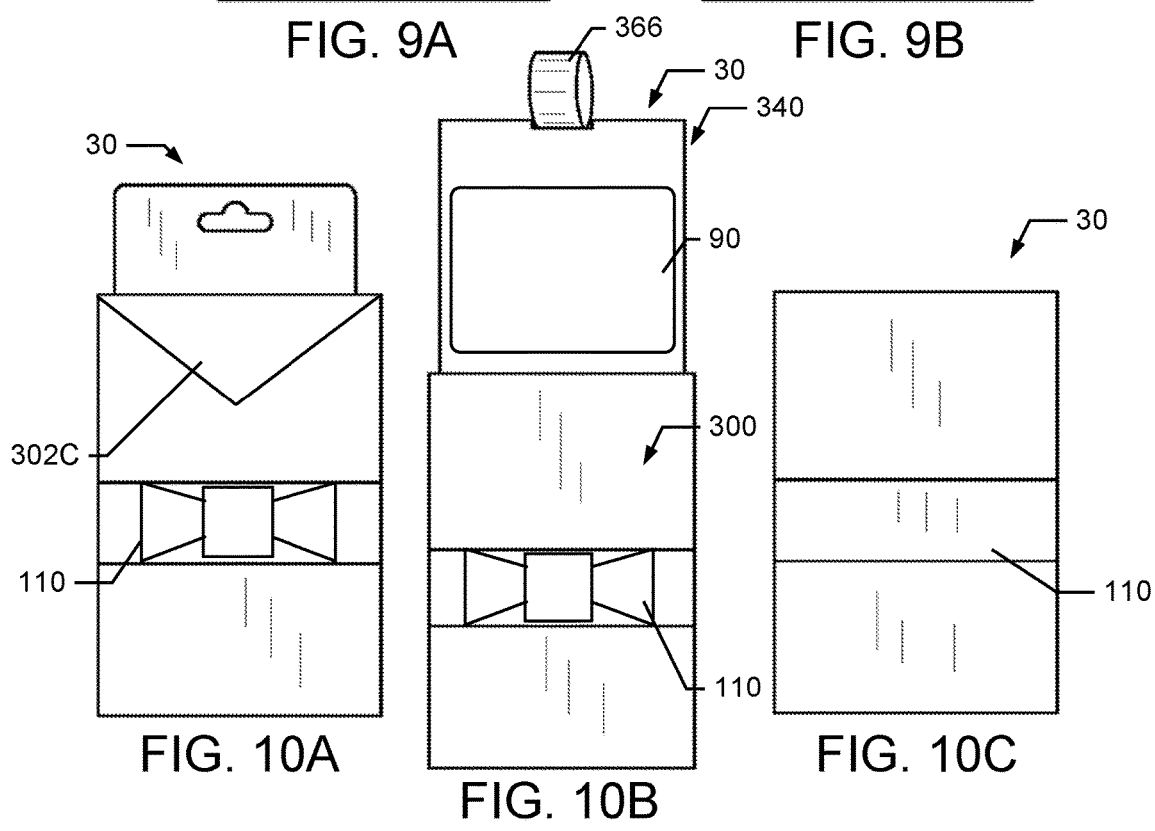
FIGS. 10A and 10B are front plan views of a slide-out gift card holder in a closed configuration and an open configuration, respectively, according to one embodiment.
FIG. 10C is a rear plan view of a slide-out gift card holder in a closed configuration according to one embodiment.
Figures 11A, 11B:
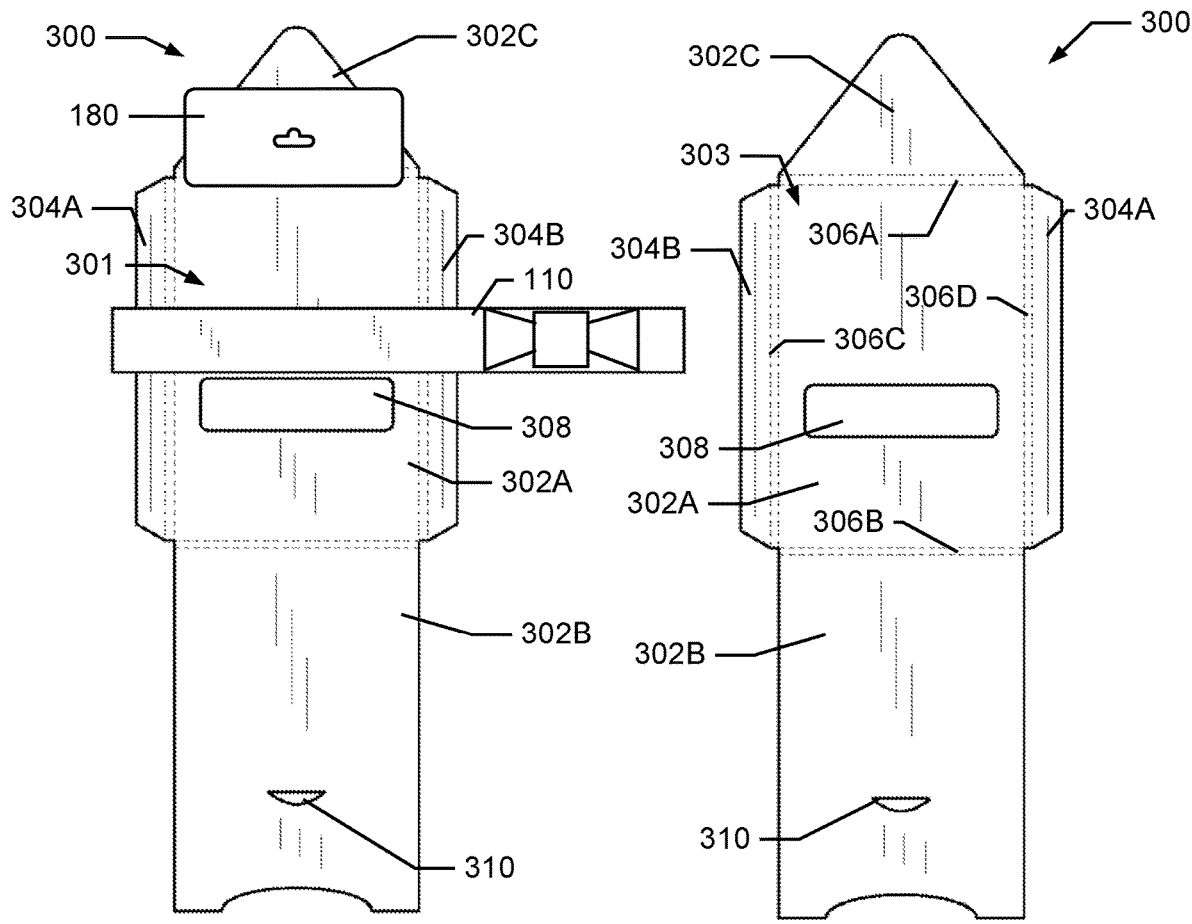
FIGS. 11A and 11B are plan views of an exterior surface and an interior surface, respectively, of an unassembled sleeve portion of a slide-out gift card holder according to one embodiment.
Figure 15:
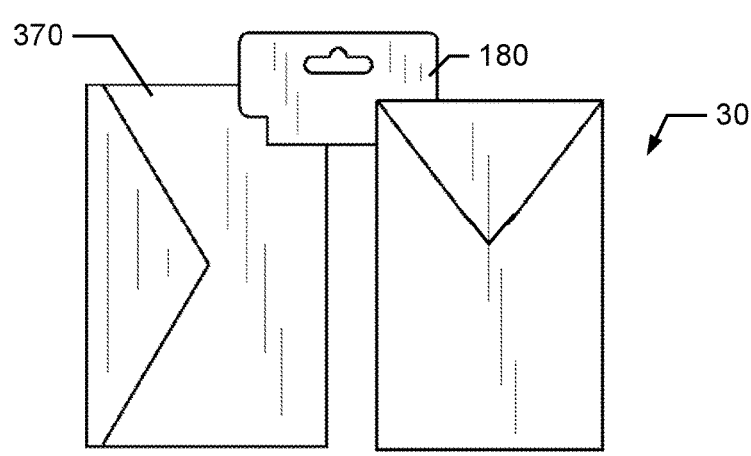
FIG. 15 is a plan view of a retail package for a slide-out gift card holder according to one embodiment.
Figure 12:
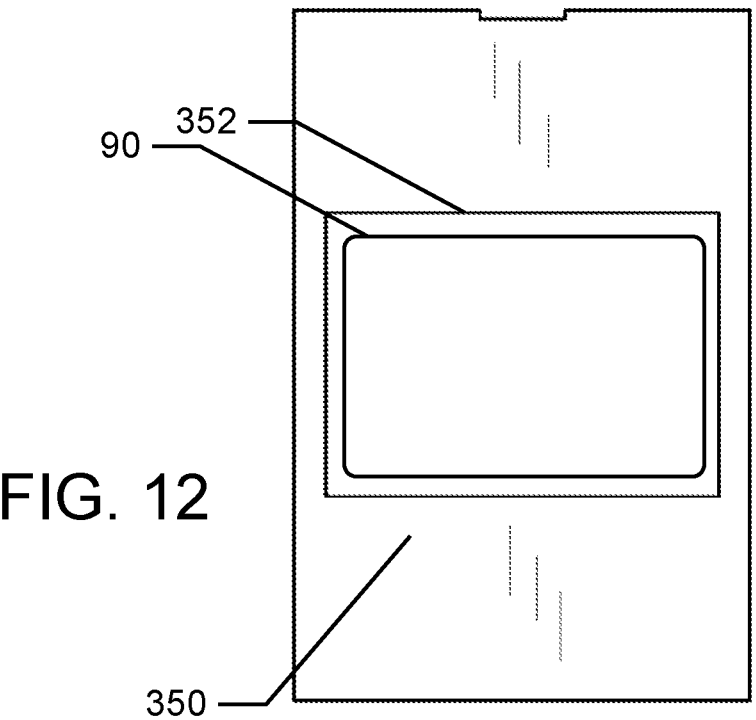
FIG. 12 is a plan view of an insert frame for a slide-out gift card holder according to one embodiment.
Figure 13:
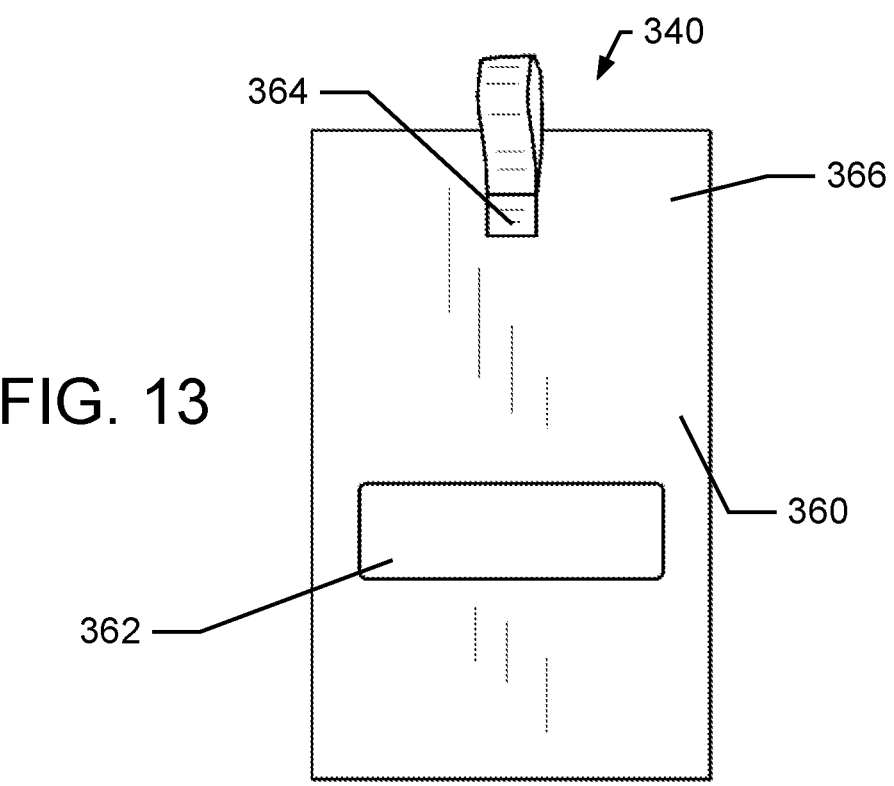
FIG. 13 is a plan view of an insert backer for a slide-out gift card holder according to one embodiment.

The slidable gift card insert 250, shown in FIGS. 9A and 9B, is also made from a planar material that is marked with indicia on the exterior surface 251 or the interior surface 253. The insert 250 is formed by cutting and folding along the fold 254 to bring the interior surfaces of the insert 250 into close proximity to each other thereby forming a two-layer insert with range-limiting tabs 252A-B. An adhesive is applied to the tabs 252A-B that are folded inward to hold the folded insert together. The insert 250 has one or more cutouts or openings 270 that align with the cutout 208 and allow a barcode or other indicia on a gift card attached to the insert 250 to be viewed and scanned when the insert is positioned within the pocket portion 200. In addition, the insert 250 may include additional adornments, such as a handle 256. The range limiting tabs 252A-B are dimensioned such that the width "W" of the insert 250 along the fold 254 and the latitudinal axis between the tabs is greater than the width of the upper portion 255 of the trapezoidal shaped pocket portion 200, as shown in FIG. 7B. As such, the range limiting tabs 252A-B prevent the insert 250 from being removed from the pocket portion 200 unintentionally. Translating the insert portion 250 away from the pocket portion 200, as indicated by 99 in FIG. 7A, simulates the opening of a gift bag to reveal the gift card 90.

Figure 4:
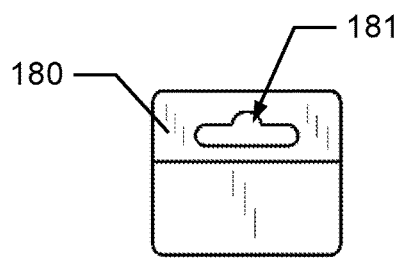
FIGS. 4-6 are plan views of embodiments of adornments and accessories that may be used with the gift card holders disclosed herein.
Figure 5:
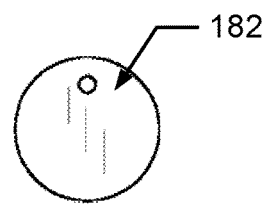
Figure 6:
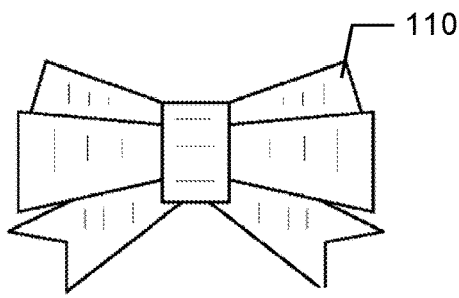

The gift card holder 20 may also include additional features, including a removable tab 180, shown in FIG. 4, for displaying the gift card holder at a retail location and a tag 182, shown in FIG. 5, for identifying the gift giver and recipient. Additional adornments including, but not limited to a ribbon, may be attached to the holder to enhance the appearance thereof Slide-Out Gift Card Holders FIGS. 10A-15 depict an embodiment of a slide-out gift card holder 30 having a sleeve portion 300 and a removable gift card insert 340. In one aspect, the sleeve portion 300 may be formed from cutting and folding a planar material 301, such as but not limited to paper, cardstock, paperboard, foil, or cardboard. One or more of the external surface 301 or the internal surface 303 of the planar material shown in FIG. 11A may be printed, painted, or otherwise marked with graphics or indicia. The planar material 301 is cut or scored to form a front portion 302A, a back portion 302B, and a flap 302C, as well as tabs 304A-B. In one aspect, the front and back portions 302A-B are dimensioned to have a height approximately greater than the height or width of a typical gift card, depending upon the orientation of the gift card within the holder 30 such that the gift card can be fully received within the sleeve portion. The front, back, and flap portions 302A-C, respectively, and the tabs 304A-B are defined and separated by one or more folds 306A-D. In addition, the back portion 302B includes a cutout or opening 308. The cutout 308 allows a barcode or other indicia on a gift card positioned within the sleeve to be viewed and scanned without removing the gift card from the sleeve portion 300. The sleeve portion 300 is formed by folding the planar material along folds 306A-B to position the interior surface of the front portion 302A proximal to and facing the interior surface of the back portion 302B. An adhesive is applied to the tabs 304A-B which are then affixed to the interior surface of rectangular portion 302B, thereby forming a sleeve that is opened at the end proximal to the flap 302C. The flap may be folded and inserted into a slot 310 that is cut into the front portion 302A to close the sleeve portion 300. The sleeve portion 300 may include additional indicia and adornments, such as an area to identify the gift giver and recipient or a ribbon and bow. In addition, the sleeve portion 300 may include a removable tab 180, as shown in FIG. 4, for displaying the slide-out gift card holder 30 at a retail location.

In one embodiment, the removable gift card insert 340 is made from two or more planar materials that are each marked with indicia or graphics on one or more surfaces thereof. The insert 340 is formed by cutting the planar materials to fabricate a front frame 350 and a backer panel or board 360. The front frame 350 is affixed on top of a backer board 360. In particular, the front frame 350 is cut to create a generally rectangular opening 352 dimensioned to receive and hold a gift card 90, while that backer board 360 includes a cutout or opening 362 for viewing indicia on the gift card engaged to the insert 340. The cutout 362 aligns with the cutout 308 to allow a barcode or other indicia on the gift card placed within the frame opening 352 to be viewed and scanned when the insert 340 is positioned within the sleeve portion 300. The backer board 360 may include another cutout or opening 364 to receive a pull tab, which may be a looped ribbon 366 in one embodiment, for removing the insert 340 from the sleeve portion 300. In another embodiment, the frame 350 and the backer board 360 may be formed from a single planar material that is folded upon itself.

Figure 14A:
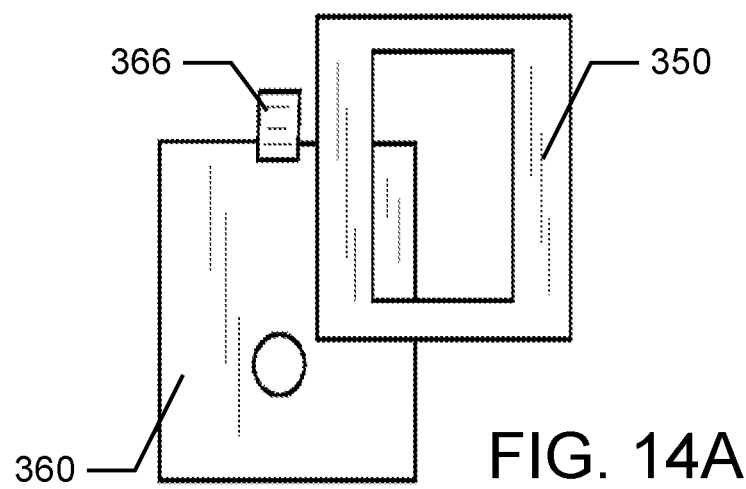
FIG. 14A is a diagram of the assembly of an insert for a slide-out gift card holder according to one embodiment.
Figure 14B:
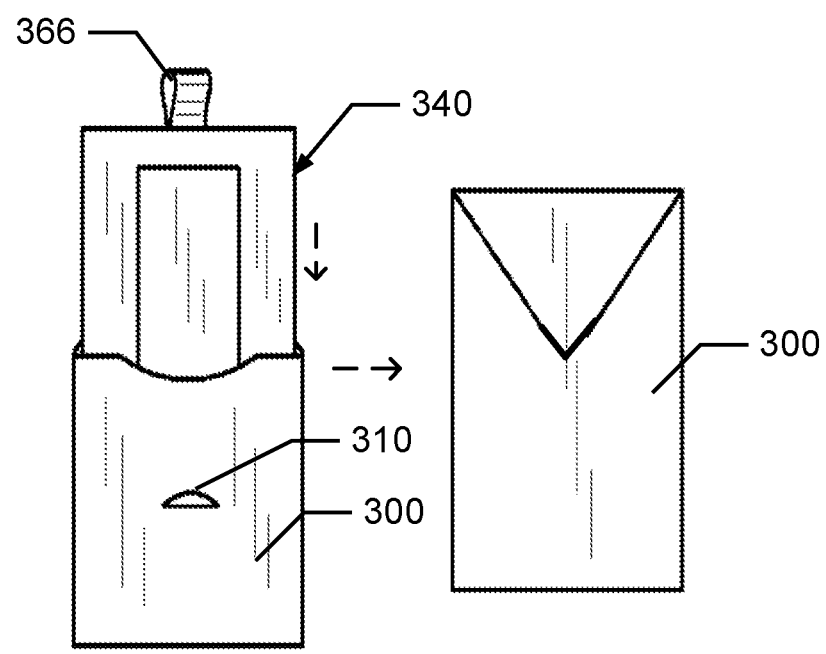
FIG. 14B is a diagram of the assembly of a slide-out gift card holder according to one embodiment.
Figure 16:
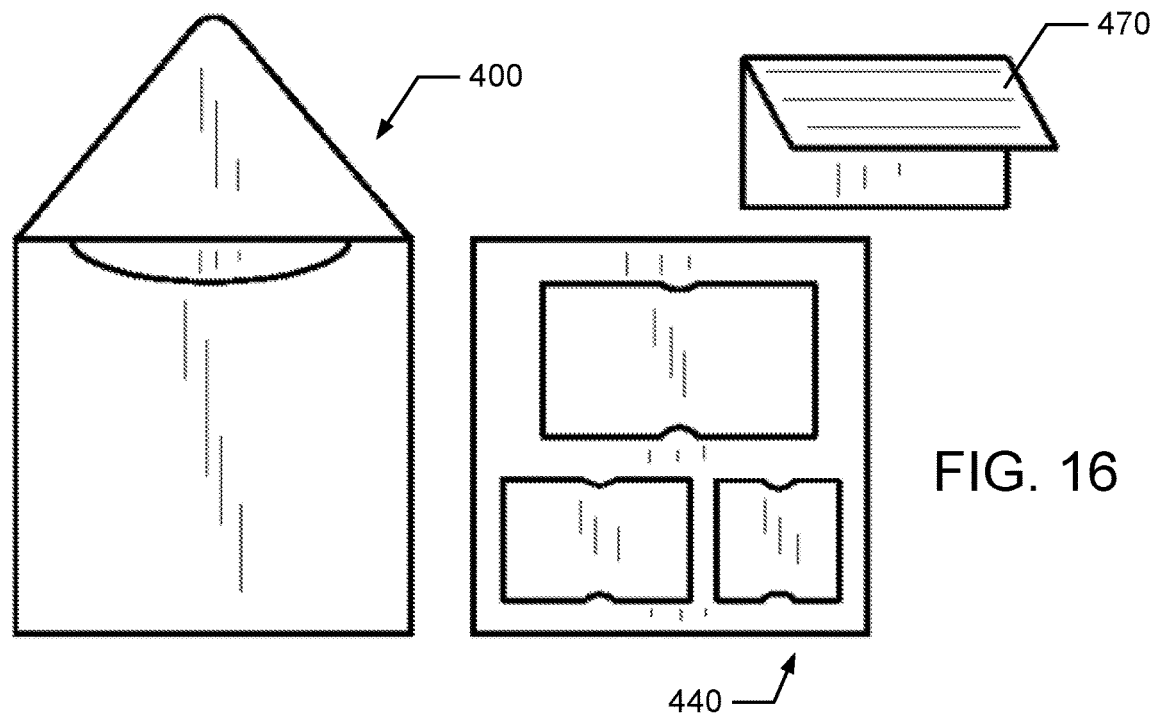
FIG. 16 is a diagram of various components of a photo frame gift card holder according to one embodiment.
Figures 17A, 17B:
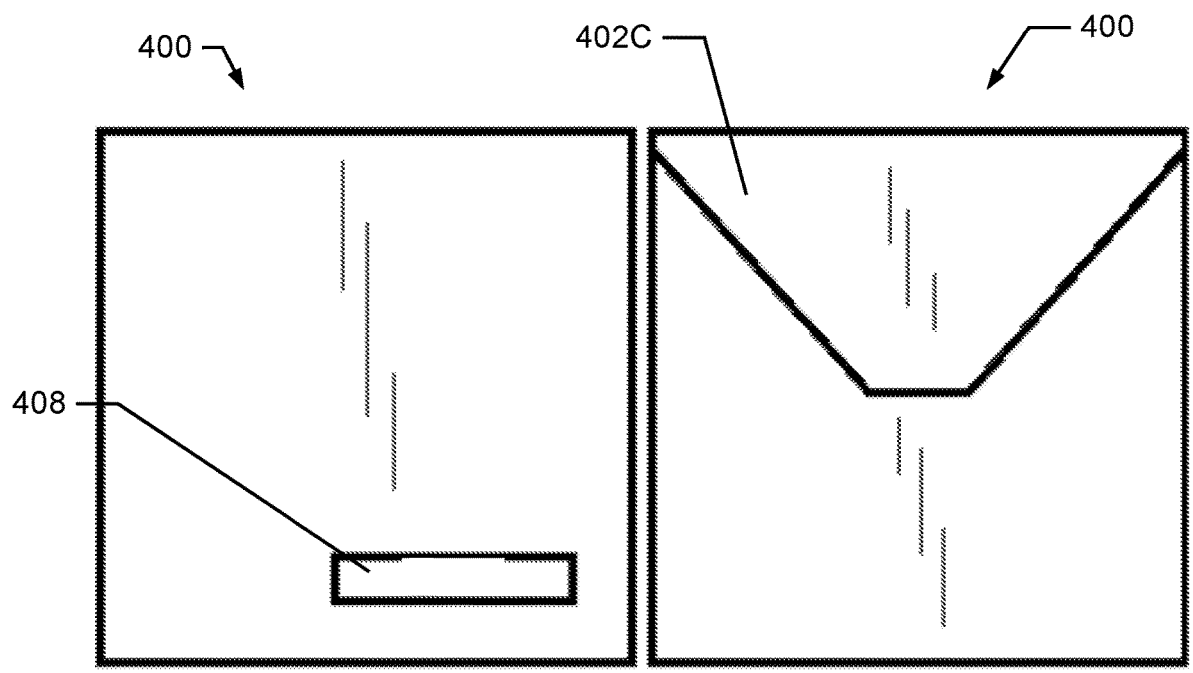
FIGS. 17A and 17B are a rear plan view and a front plan view, respectively, of an assembled envelope portion of a frame gift card holder according to one embodiment.
Figure 18:
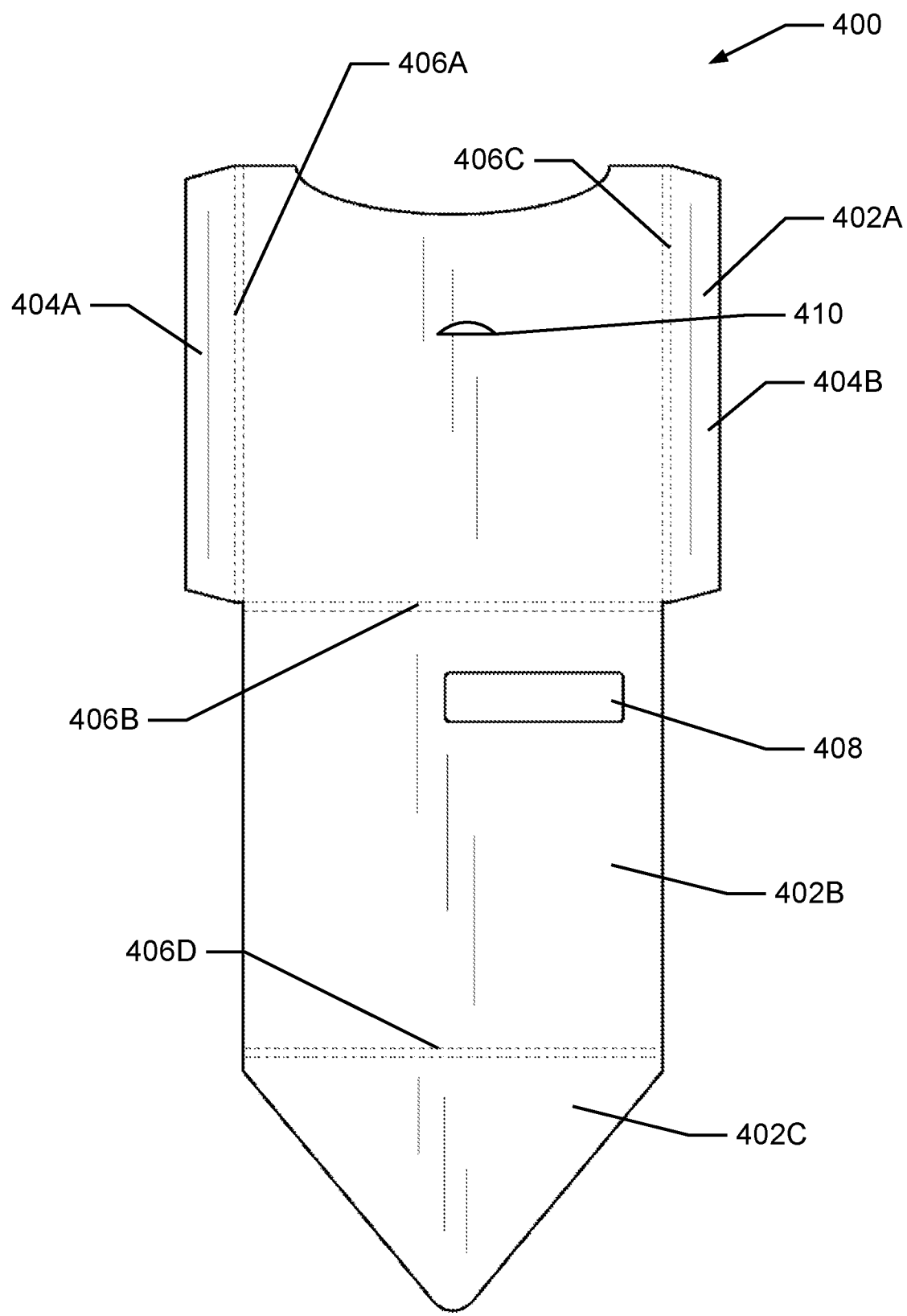
FIG. 18 is a plan view of an exterior surface of an unassembled envelope portion of a frame gift card holder according to one embodiment.
Figure 19:
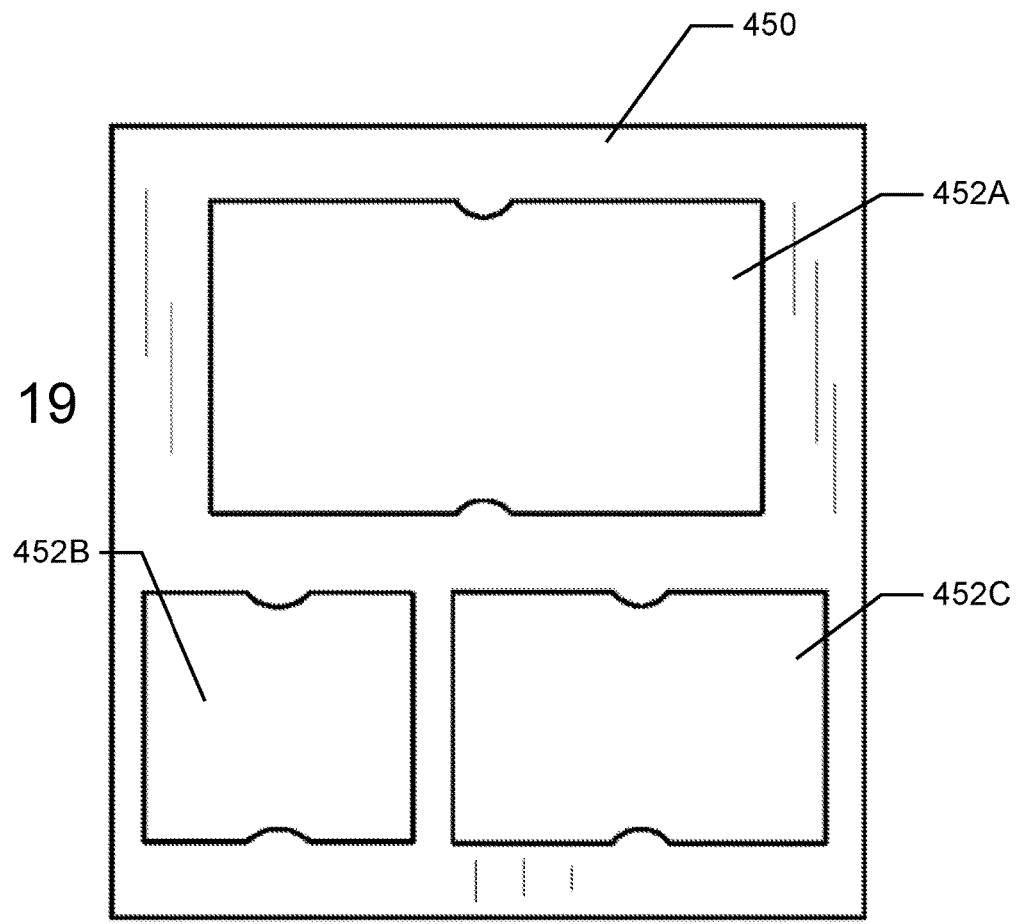
FIG. 19 is a plan view of a frame portion for a frame insert of a frame gift card holder according to one embodiment.
Figure 20A:
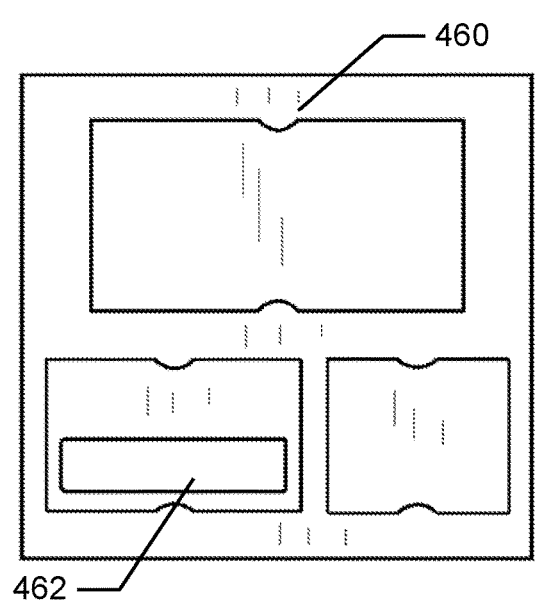
FIGS. 20A and 20B are a front plan view and a rear plan view, respectively, of a frame backer panel for a frame insert of a frame gift card holder according to one embodiment.
Figure 20B:
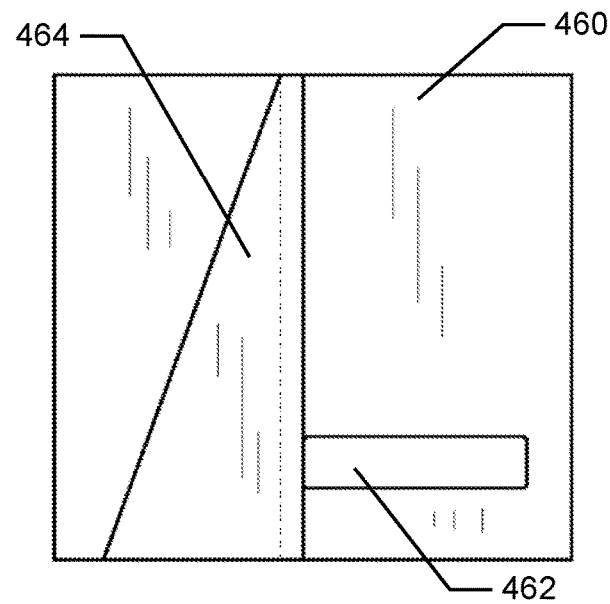
Figure 21:
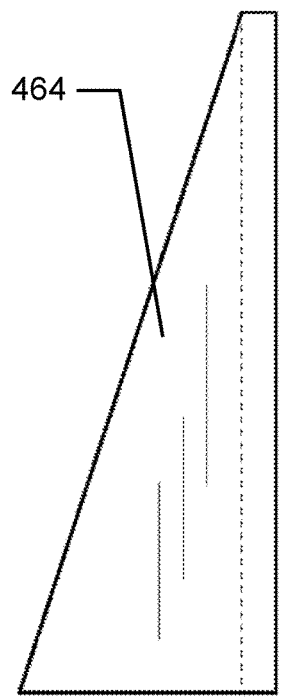
FIG. 21 is a plan view of an easel support for a frame insert of a frame gift card holder according to one embodiment.

To assemble the holder 30, the front frame 350 is affixed to the backer board 360. The insert 340 is then inserted into the sleeve 300 as shown in FIG. 14B. In one embodiment, a gift card 90 may be provided with the slide-out gift card holder 30. In another embodiment, the slide-out gift card holder 30 may be used or re-used with any gift card 90.

In various aspects, an envelope 370 may be included with the slide-out gift card holder 30. The envelope and additional tags or stickers (not shown), may be included within a separate cellophane sleeve portion (not shown). Together, the envelope and slide-out gift card holder 30 may be displayed in a retail location for sale as a single item, shown in FIG. 15, using a removable tag similar to the tag 180 shown in FIG. 4.

A Frame Gift Card Holder

An embodiment of a framed gift card holder 40 is depicted in FIGS. 16-23. The framed gift card holder 40 includes an envelope portion 400 and a removable photo frame insert 440. In one aspect, the envelope 400 may be formed from cutting and folding a planar material, such as but not limited to paper, cardstock, paperboard, foil, or cardboard. One or more sides or surfaces of the envelope portion 400 may be printed, painted, or otherwise marked with indicia. The envelope portion includes a front portion 402A, a back portion 402B, and a flap 402C, as well as tabs 404A-B. In one aspect, the front and back portions 402A-B are dimensioned to approximate the size of a typical greeting card; however, in other embodiments, other sizes may be used. The front, back, and flap portions 402A-C, respectively, and the tabs 404A-B are defined and separated by one or more folds 406A-C. In addition, the back portion 402B includes a cutout or opening 408. The cutout 408 allows a barcode or other indicia on a gift card disposed within the envelope 400 to be viewed and scanned without removing the gift card from the envelope. The envelope 400 is formed by folding the planar material along folds 406B to position the interior surface of the front portion 402A proximal to and facing the interior surface of the back portion 402B. An adhesive is applied to the tabs 404A-B which are then affixed to the interior surface of rectangular portion 402B, thereby forming the envelope that is opened at the end proximal to having the flap 402C. The flap may be folded and inserted into a slot 410 that is cut into the front portion 402A to close the envelope 400. The envelope 400 may include additional indicia and adornments, such as an area to identify the gift giver and recipient or a ribbon and bow. In addition, the envelope 400 may include a removable tab 180, shown in FIG. 4, for displaying the framed gift card holder 40 at a retail location.

In one embodiment, the removable gift card insert 440 is also made from two or more planar materials that are each marked with indicia on one surface. The insert 440 is also formed by cutting the planar materials and affixing a front frame 450 on top of a backer board 460. In another embodiment, the insert 440 is formed from a single planar material that is cut and folded upon itself. In particular, the front frame is cut to create two or more openings 452A-C. The openings 452A-C may be generally rectangular as shown or they may be any other shape. At least one of the openings 452A-C is dimensioned to receive and hold a gift card, while the other openings are dimensioned to display one or more other items, including but not limited to photographs, greeting cards, notes, or business cards.

The backer board 460 includes a cutout or opening 462 that aligns with the cutout 408 to allow a barcode or other indicia on the gift card placed within the frame of the insert 440 to be viewed and scanned when the insert is positioned within the envelope 400. In addition, the backer board 460 may also include an easel attachment 464 that is engaged to the backer board. The easel attachment 464 may be made of the same planar material as the insert, or alternately, may be made of any other material, including plastics, that provides sufficient support to prop up the insert 440. In one aspect, the insert 440 may be placed on a surface and displayed as a photo frame, thereby augmenting the gift and further enhancing the gift giving experience.

Figure 22:
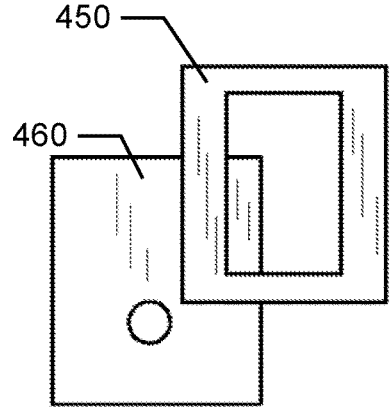
FIG. 22 is a diagram of the assembly of a frame insert of a frame gift card holder according to one embodiment.
Figure 23:
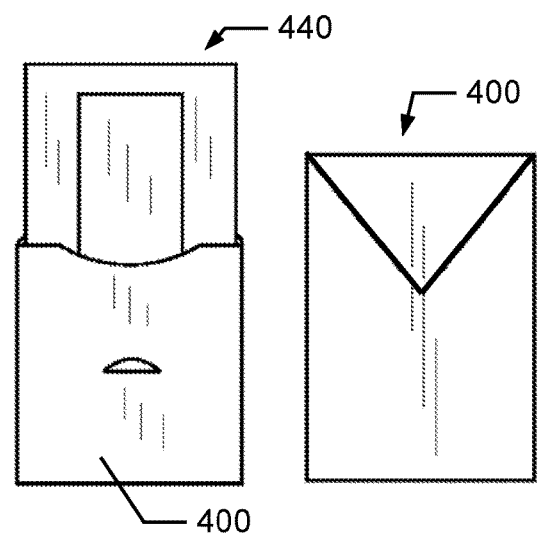
FIG. 23 is a diagram of the assembly of a frame gift card holder according to one embodiment.

To assemble the insert 440, a front frame 450 is affixed to the backer board 460, as shown in FIG. 22, and the easel attachment is attached to the backer board on the side opposite the front frame. Before being given to a recipient, the photo frame insert 440 is then inserted into the envelope 400 along with any greeting cards or notes 470, as shown in FIG. 23. In one embodiment, the greeting card 470, note or photographs may be inserted into one of the openings 452A-C of the insert 440.

Revealing Gift Card Holders

Figures 26A, 26B:
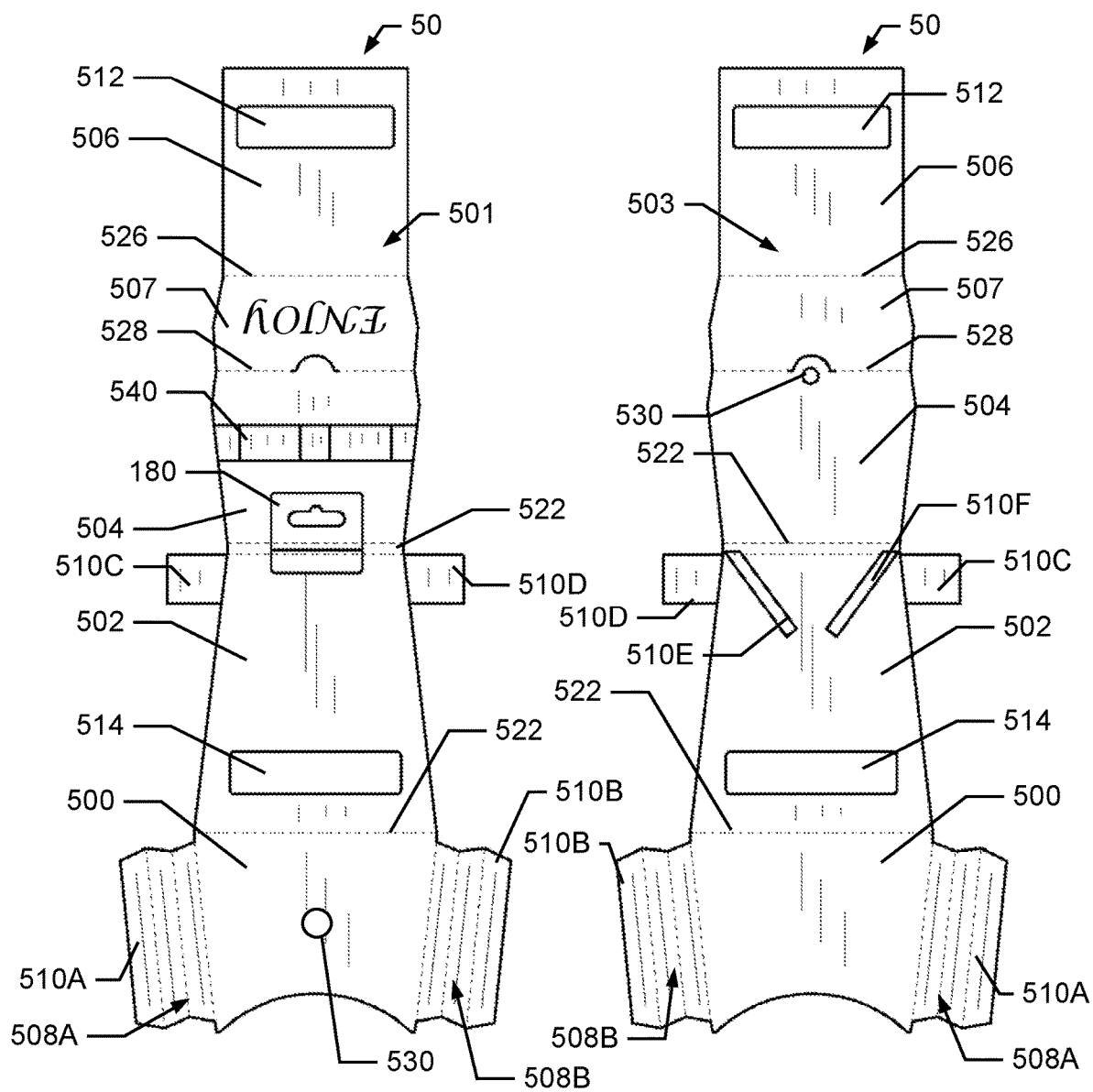
FIGS. 26A and 26B are plan views of an exterior surface and an interior surface, respectively, of an unassembled revealing gift card holder according to one embodiment.

Referring now to FIGS. 24-26B, one embodiment of a revealing gift card holder 50 is shown. In one aspect, the revealing gift card holder 50 is fabricated by cutting and folding a planar material, such as but not limited to paper, cardstock, paperboard, foil, or cardboard, into a desired shape. One or more of the external surface 501 or the interior surface 503 of the planar material, as shown in FIGS. 26A-B, may be printed, painted, or otherwise marked with graphics or indicia. Various cuts and folds may be made to the planar material to define a front panel 500, a back panel 502, a lid panel 504, a gift card panel 506, gusset panels 508A-B, and tabs 510A-F in the planar material.

In one embodiment, the front panel 500, the back panel 502, and the lid panel 504 are generally trapezoidal in shape. In one aspect, the trapezoidal portions are shaped and marked to resemble a shopping bag, and the gift card holder 50 may include a handle 554. Other shapes and configurations may also be used, including but not limited to a generally rectangular shape, as shown for the gift card panel 506. In one embodiment, the gift card panel 506 includes a sub-panel 507 that may include a message, graphics, or other indicia that is viewable by the gift recipient upon translation of the gift card panel to reveal the gift card 90.

In various aspects, both the back panel 502 and the gift card panel 506 have cutouts 512 and 514, respectively, which allow a barcode or other indicia on a gift card attached to the gift card panel to be viewed and scanned when the holder 50 is in a closed configuration, as shown in FIG. 24.

To assemble the gift card holder 50, the planar material is folded along fold 520 so that the interior surface of the front panel 500 is proximal to and facing the interior surface of the back panel 502. An adhesive is placed in the tabs 510A-B of the gusset panels 508A-B, such that the gusset panels may be affixed to the interior surface of the back panel 502. In one embodiment, once assembled the gift card panel 506 cannot be completely removed from the pocket formed by the front panel 500 and back panel 502 without folding or otherwise altering the holder 50.

The planar material is folded along folds 522 and 524 to position the gift card panel 506 within the gussets of the gusset panel 508A-B, preferably within the front-most gusset of the gusset panels. Folding at folds 526 and 528 allows the lid panel 504 to overlap the front panel 500 when the gift card panel 506 is fully inserted into the gussets as shown in FIG. 24. In one aspect, the lid panel 504 includes a closing mechanism 530, such as hook-and-loop fasteners or a removable adhesive, for removably engaging the lid panel to the front panel 500.

The tabs 510C-F provide attachment points for optional adornments such as a ribbon 540 or a bow. The gift card holder 50 may also include a removable tab 180, shown in FIG. 4, for displaying the gift card holder 50 at a retail location, or a tag 182, shown in FIG. 5, for indicating the gift giver and the recipient.

Another embodiment of a revealing gift card holder 60 is shown in FIGS. 27A-29. Similar to the revealing gift card holder 50 shown in FIGS. 24-26B, the holder 60 is fabricated by cutting and folding a planar material. One or more sides or surfaces of the planar material may be printed, painted, or otherwise marked with indicia. As shown, various cuts and folds may be made to define a front panel 600, a back panel 602, a lid panel 604, a gift card panel 606, side panels 608A-B, flaps 610A-D, and various tabs 612A-F in a single sheet of the planar material.

Figure 27A:
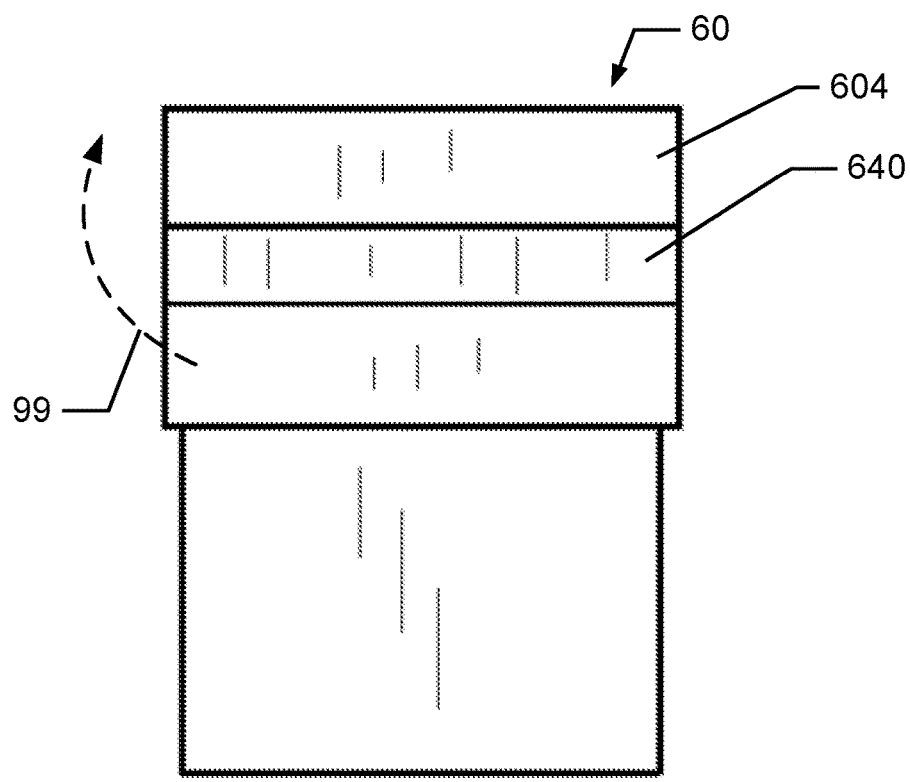
FIGS. 27A and 27B are front plan views of a revealing gift card holder in a closed and open configuration, respectively, according to one embodiment.
Figure 27B:
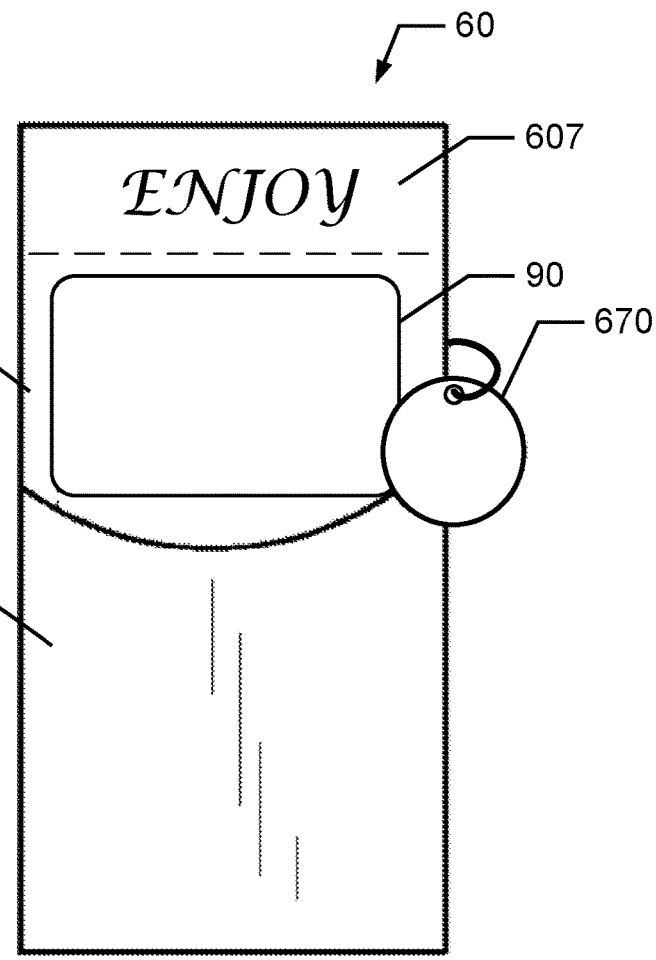

In one aspect, the front panel 600, the back panel 602, and the lid panel 604 may be generally rectangular. In addition, the flaps 610A-D may be configured such that the holder resembles a box, when assembled. In various aspects, both the back panel 602 and the gift card panel 606 have cutouts or openings 614 and 616, respectively, which allow a barcode or other indicia on a gift card 90 attached to the gift card panel to be viewed and scanned when the holder 60 is in a closed configuration, as shown in FIG. 27A. The gift card 90 in this embodiment and all other embodiments may be engaged to the various gift card panels with a removable adhesive or through one or more slits 613, as shown in FIG. 29.

To assemble the gift card holder 60, the planar material is folded along folds 620A-B so that the interior surface of the front panel 600 is facing the interior surface of the back panel 602. In one embodiment, an adhesive is placed on one or more of the flaps 610A-D, such that the side panels and the front and back panels 600 and 602, respectively, may form a box.

Figure 28A:
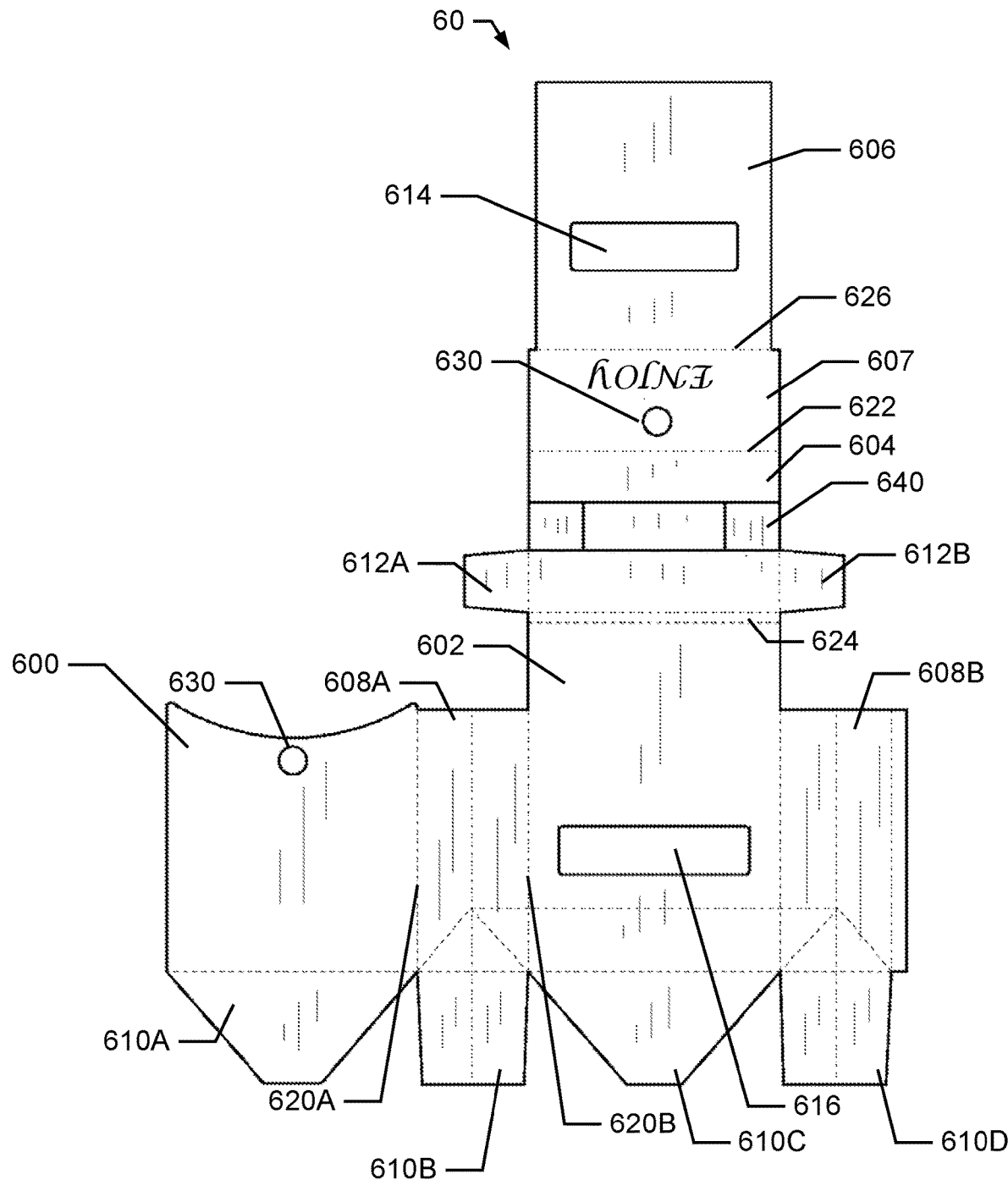
FIGS. 28A and 28B are plan views of an exterior surface and an interior surface, respectively, of an unassembled revealing gift card holder according to one embodiment.
Figure 28B:
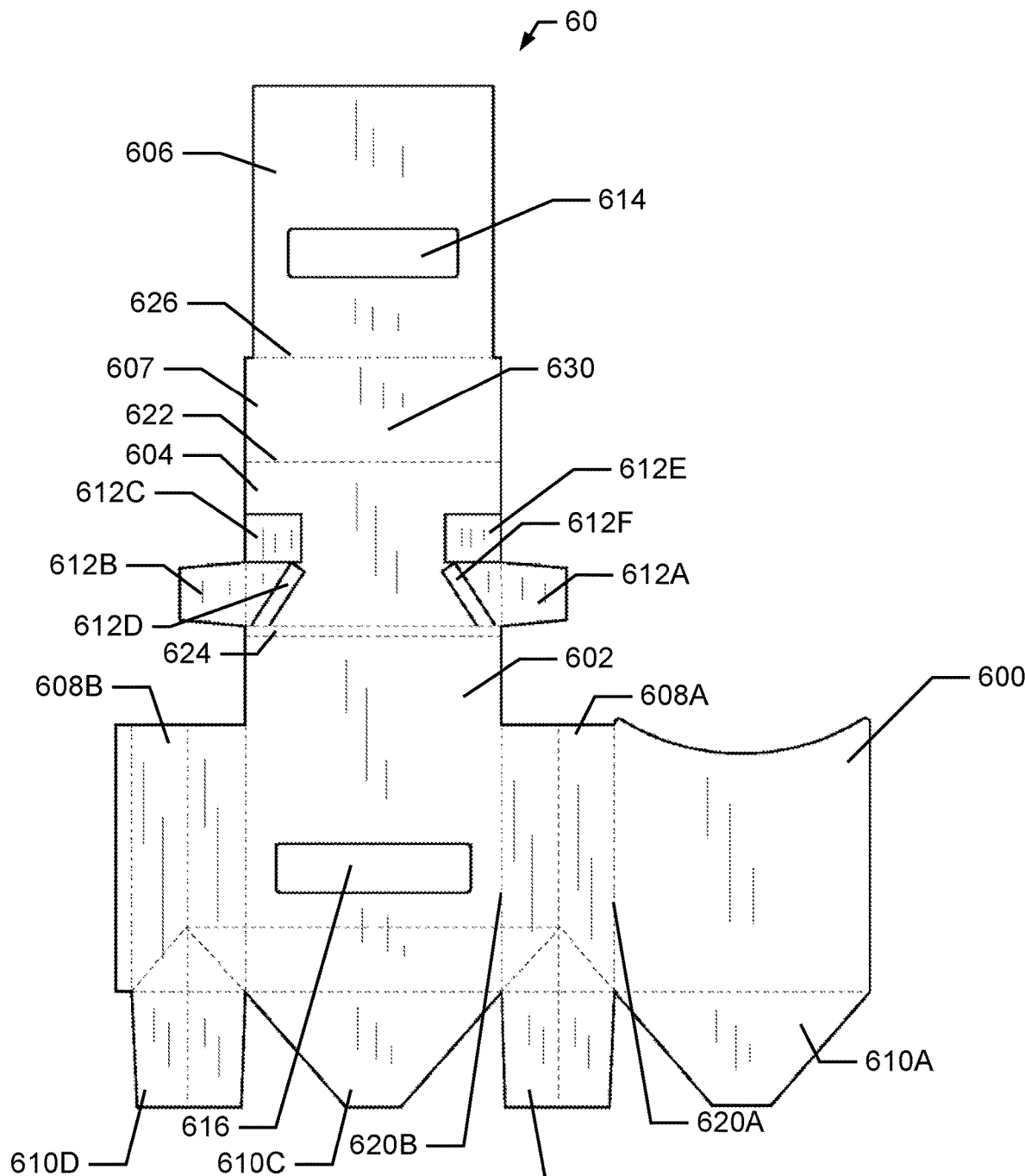
Figure 35A:
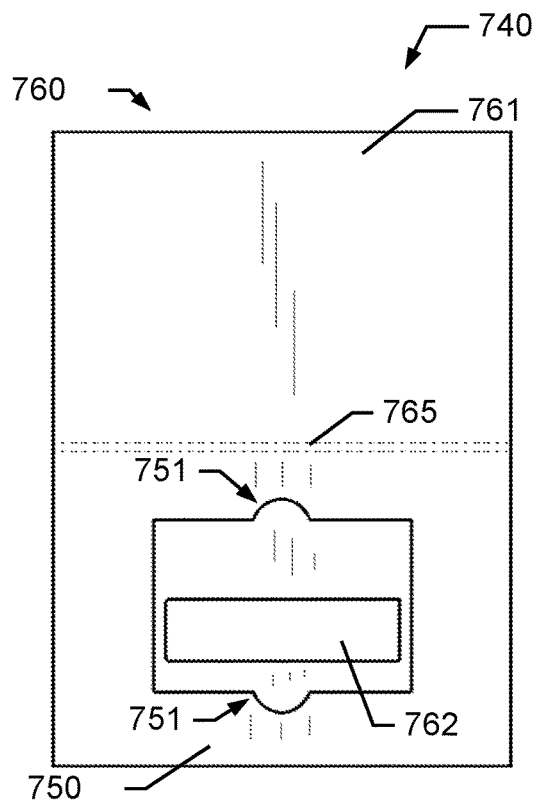
FIGS. 35A and 35B are a front plan view and a rear plan view, respectively, of an assembled bi-fold insert portion of a bi-fold gift card holder according to one embodiment.
Figure 35B:
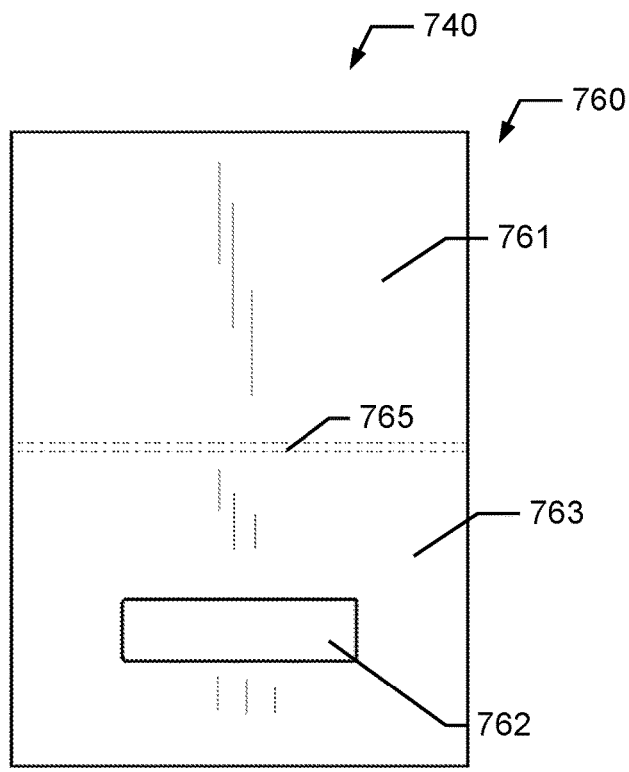

The planar material is folded along folds 622 and 624 to position the gift card panel 606 within a box formed by the front panel 600, the back panel 602, side panels 608A-B, and the flaps 610A-D, as indicated by 611. In one embodiment, the gift card panel 606 includes a sub-panel 607 that may include a message, graphics, or other indicia that is viewable by the gift recipient upon translation of the lid panel 604, as indicated by 99 in FIG. 27A, to reveal the gift card 90. Additional folding at fold 626 allows the lid panel 604 to overlap the front panel 600, when the gift card panel 606 is fully inserted into the box as shown in FIG. 27A. In one aspect, the lid panel 604 includes a closing mechanism 630, such as hook-and-loop fasteners or a removable adhesive, as shown in FIG. 28A, for attaching the lid panel to the front panel 600.

The tabs 612A-F provide attachment points for optional adornments such as a ribbon and bow 640 or handle 654, as shown in FIG. 29. The gift card holder 60 may also include a removable tab 180, shown in FIG. 4, for displaying the gift card holder 60 at a retail location or a tag 182, shown in FIG. 5, for indicating the gift giver and the recipient.

A Bi-Fold Gift Card Holder

FIGS. 30-37 depict an embodiment of a bi-fold gift card holder 70 that includes a decorated closure band 770. The holder 70 has general bi-fold configuration with an outer sleeve portion 700 engaged to at least one surface of an insert portion 740. In one aspect, the holder 70 is fabricated by cutting and folding one or more sheets of planar material, such as but not limited to paper, cardstock, paperboard, foil, or cardboard. Each sheet of the planar material may be printed, painted, or otherwise marked with indicia on at least one side. The outer sleeve portion is formed from a planar material that is cut and scored to form a front portion 702A, a back portion 702B, and tabs 704A-B. In one aspect, the front and back and portions 702A-B, respectively, and the tabs 704A-B are defined and separated by one or more folds 706A-E. In addition, the back portion 702B includes a cutout or opening 708. The cutout 708 allows a barcode or other indicia on a gift card positioned within the holder 70 to be viewed and scanned without removing the gift card from the holder. An adhesive is applied to the tabs 704A-B which are then affixed to the interior surface of a bi-fold insert 740. The sleeve 700 may include additional indicia and adornments, such as an area to identify the gift giver and recipient or a ribbon and bow. In addition, the sleeve 700 may include a removable tab 180, shown in FIG. 4, for displaying the gift card holder 70 at a retail location.

In one embodiment, the bi-fold insert 740 is also made from two or more planar materials that are each marked with indicia or graphics on at least one surface. The insert 740 is also formed by cutting the planar materials and affixing a front frame 750 on top of a panel of a backer board 760, having a front portion 761 and a back portion 763 separated by a fold line 765. In particular, the front frame 750 is cut to create a generally rectangular opening 752, dimensioned to receive and hold a gift card. The front frame 750 may also include one or more cutouts 751 that aid the removal of a gift card disposed in the frame. The backer board 760 includes a cutout or opening 762 that aligns with the cutout 708 to allow a barcode or other indicia on the gift card placed within the frame opening 752 to be viewed and scanned when the insert is positioned within the sleeve 700. To assemble the insert 740, the front frame 750 is affixed to the interior surface 767 of the back portion 763 of the backer board 760. The sleeve 700 is also engaged to an exterior surface of the insert 740.

Figure 36:
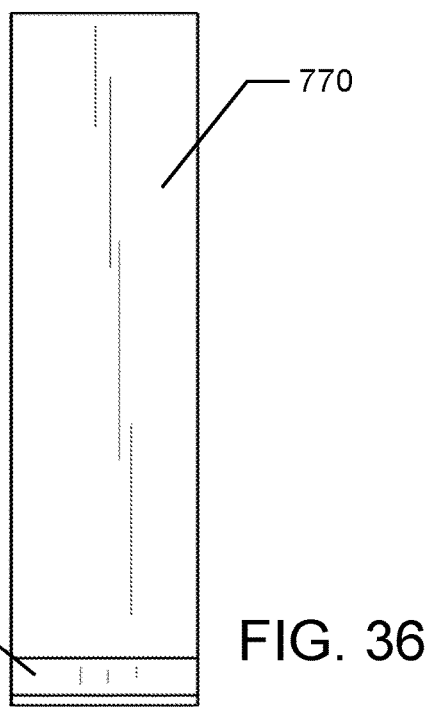
FIG. 36 is a plan view of a closure band of a bi-fold gift card holder according to one embodiment.
Figure 37:
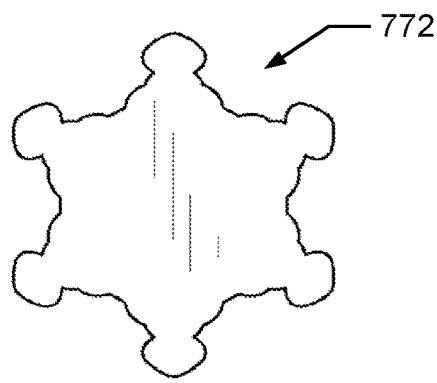
FIG. 37 is a plan view of a decorative element for a closure band of a bi-fold gift card holder according to one embodiment.
Figure 38A:
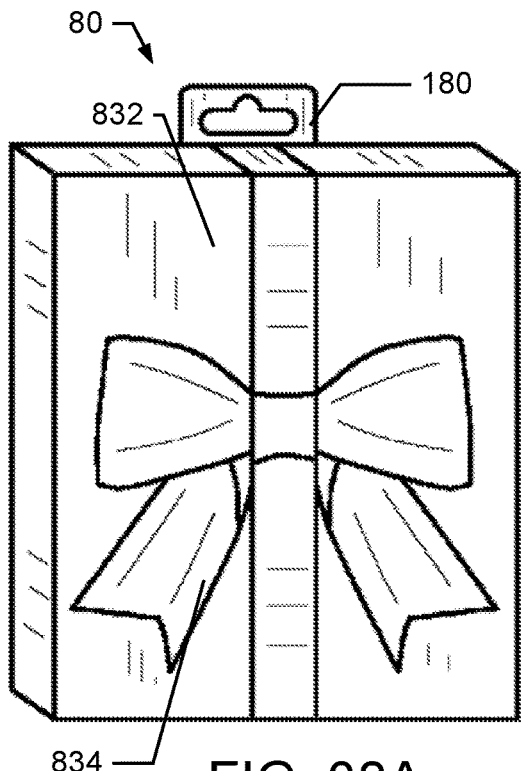
FIGS. 38A and 38B are front plan view and rear plan view, respectively, of a gift box gift card holder according to one embodiment.
Figure 38B:
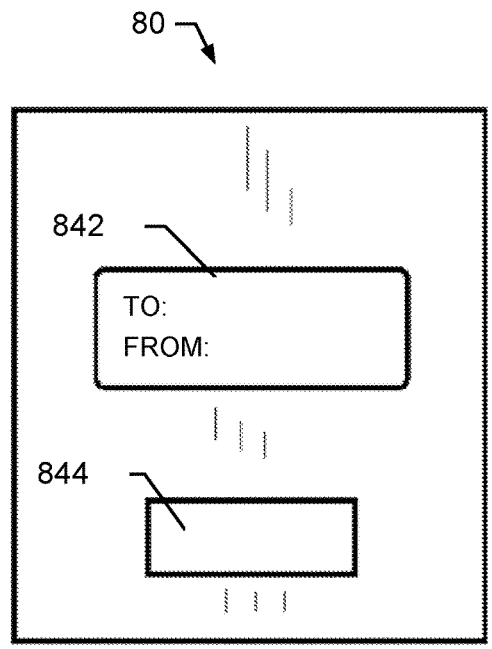
Figure 38C:
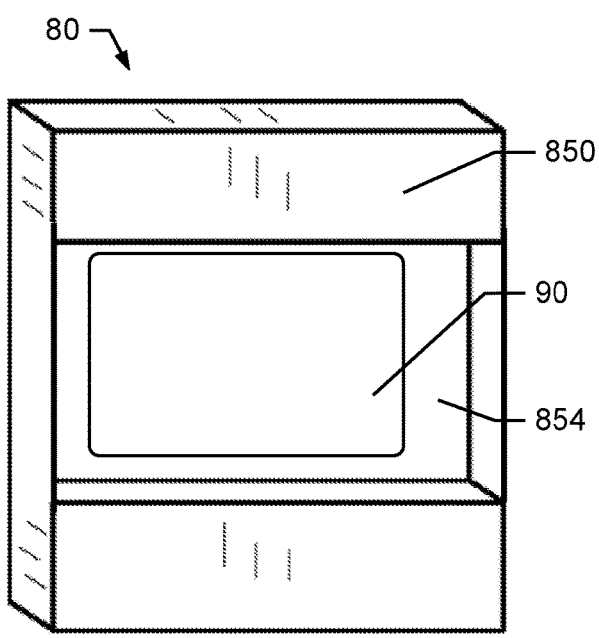
FIG. 38C is a perspective plan view of a gift box gift card holder with the lid removed according to one embodiment.
Figure 39:
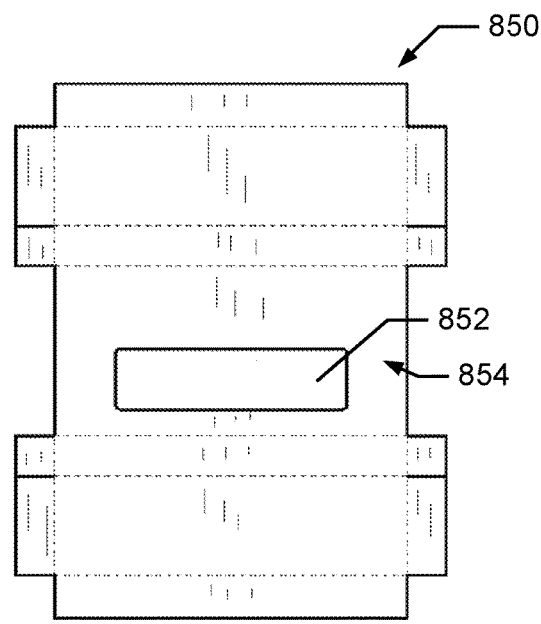
FIG. 39 is a plan view of an unassembled tray of a gift box gift card holder according to one embodiment.
Figures 40A, 40B:
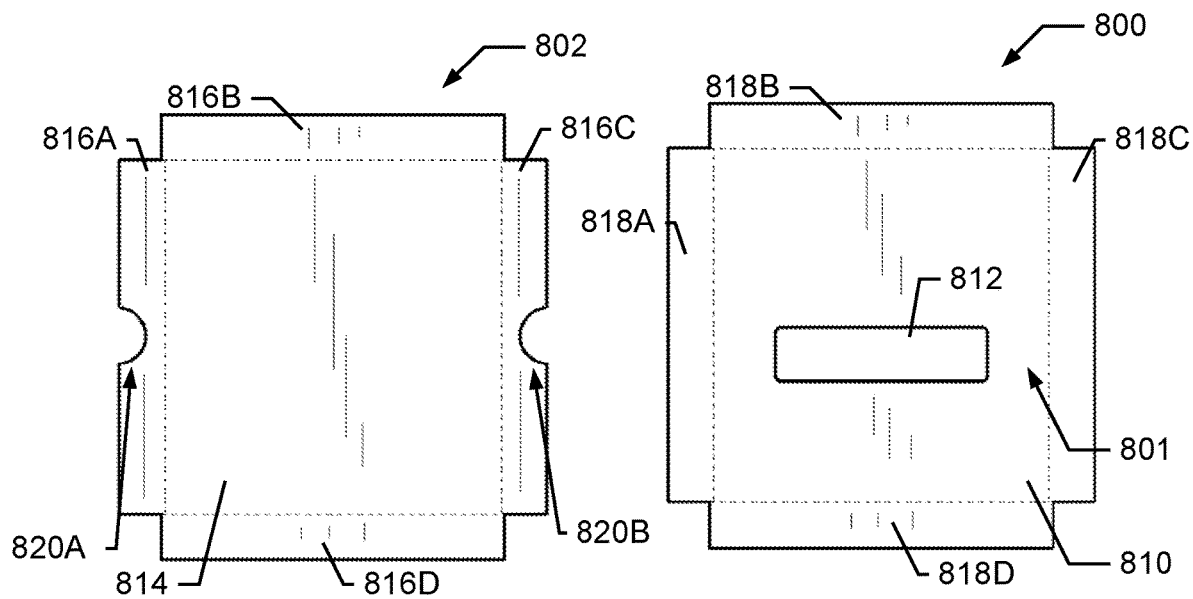
FIGS. 40A and 40B are plan views of a lid and bottom portion, respectively, of a gift box gift card holder in an unassembled configuration according to one embodiment.
Figure 41:
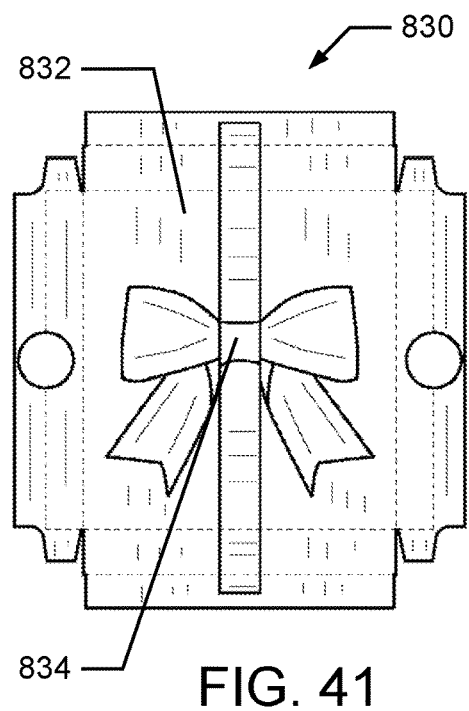
FIG. 41 is a plan view of a decorative lid cover for a lid portion of a gift box gift card holder in an unassembled configuration according to one embodiment.
Figure 42:
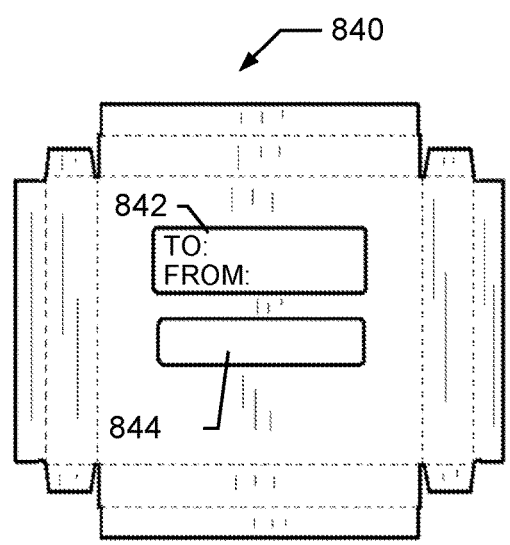
FIG. 42 is a plan view of a decorative bottom cover for a bottom portion of a gift box gift card holder in an unassembled configuration according to one embodiment.

In various aspects, a band 770, shown in FIGS. 30 and 36, for holding the gift card holder 70 closed in a folded configuration is engaged to the holder. The band 770 may be fabricated as a continuous loop of material; alternatively, the band may be a strip of material that is adhered or otherwise attached to itself to form the band. In one embodiment, the band 770 is a planar material, such as paper, cardstock, or fabric, among others, that includes an adhesive 771 for forming the continuous loop. In one aspect, the band 770 may include one or more additional adornments 772. In various aspects, the adornments 772 and indicia for the gift card holder 70 may vary in accordance with the purpose of the gift, the holiday, or season. For example, the adornment may have the general shape of a snowflake for giving a gift during winter.

A Gift Box Gift Card Holder

FIGS. 38A-42 depict another embodiment of a gift box gift card holder 80. In this embodiment, the gift box gift card holder 80 is generally box shaped with a bottom portion 800 and a lid portion 802. The bottom portion 800 and lid portion 802 may be engaged to decorative covers 840 and 830, respectively, which include graphics or indicia. In one embodiment, the graphics and indicia may be applied directly to the bottom portion 800 and the lid portion 802. The holder 80 may also include a tray 840 within the box to hold and display a gift card placed or attached thereon.

The bottom portion 800 and a lid portion 802 are fabricated from a planar material that is cut and scored to define a respective bottom panel 810 including a cutout 812 and a top panel 814. Each portion 800 and 802 also includes sidewalls 816A-D and 818A-D, respectively, which are formed from the planar material. The sidewalls 816A-D and 818A-D may be folded inward to provide structure to the box. In one aspect, sidewalls 816A and 816C include notches 820A-B to grip and remove the lid portion 802 from the bottom portion 800 after assembly.

The decorative liners 830 and 840 are similarly formed from a planar material. One or more sides or surfaces of the planar materials for the decorative liners 830 and 840 are printed, painted, or otherwise marked with indicia. In one aspect, the markings are designed to give the appearance of wrapping paper 832 and a bow 834. One or both liners 830 and 840 may include an area 842 for indicating the gift giver and the recipient. The decorative liner 840 for the bottom portion 800 may also include a cutout 844 that aligns with the cutout 812 of the bottom panel 810 to allow a barcode or other indicia on a gift card placed in the holder 80 to be viewed and scanned when the holder is in a closed configuration, as shown in FIG. 8E. The decorative liner 840 may also be affixed with a removable tab 180, shown in FIG. 4, for displaying the gift card holder 80 at a retail location.

The tray 850 may be formed from a planar material that is cut and folded to fit within the bottom portion 800. The tray 850 includes a central portion 854 that is proximal to the bottom portion 800 of holder 80, when the tray is folded and assembled. In one embodiment, the central portion 854 is adhered to the interior surface 801 of the bottom portion 800. The central portion 854 of the tray 850 also defines a cutout or opening 852 that is aligned with the cutouts 812 and 844 to allow the barcode or other indicia on the gift card to be viewed and scanned without removing the card from the box 80. In various aspects, the tray 850 includes markings and indicia that may correspond to the gift giving occasion, holiday, or season.

For each embodiment, a gift card 90 may be included with the gift card holders 10-80. In various other embodiments, the gift card holders 10-80 may be used or re-used with any gift card 90, including those purchased separately from the purchase of the gift card holder.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A device for holding a stored value card comprising:
   a stored value card comprising a barcode or indicia;
   a sleeve portion comprising, a front panel and a back panel, wherein the front panel is hingedly connected to the back panel along a first side, and wherein the front panel and the back panel are also connected along a first edge and a second edge;
   an insert portion for receiving a stored value card, wherein the insert portion is partially slidably received by the sleeve;
   wherein the insert portion includes a first cutout aligned with the barcode or indicia of the stored value card;
   a lid panel hingedly connected to the back panel; and
   a sub-panel hingedly connected to the lid panel, wherein the sub-panel is attachedly affixed to the lid panel,
   wherein the back panel includes a second cutout configured to be aligned with the first cutout when the insert portion is slidably received in the closed position,
   wherein the sleeve portion foldably forms a box;
   wherein the lid panel comprises one or more tabs configured as attachment points to engage with adornments comprising one or more ribbons or bows.

2. The device of claim 1, wherein the insert portion further comprises an adhesive for removably engaging the stored value card.

3. The device of claim 1, further comprising a first tab on the front panel and a second tab on the lid panel, wherein in a closed disposition, the first and the second tab align with one another.

4. The device of claim 1, wherein the front panel and the lid panel each present a closing mechanism.

5. The device of claim 4, wherein the closure means is a hook and loop fastener.

6. The device of claim 1, wherein the front panel has a first flap along the first edge of the front panel, and a second flap along the second edge of the front panel, wherein the first and second flaps attach the front of the sleeve to the back panel.

7. The device of claim 1, wherein the sleeve portion has a rectangular shape.

8. A stored value card holder device comprising:
   a stored value card comprising a barcode or indicia;
   a sleeve portion comprising, a front panel and a back panel, wherein the front panel is hingedly connected to the back panel along a first side, and wherein the front panel and the back panel are also connected along a first edge and a second edge;

an insert portion for receiving the stored value card, wherein the insert portion is partially slidably received by the sleeve;

a lid panel hingedly connected to the back panel; and a sub-panel hingedly connected to the lid panel, wherein the sub-panel is attachedly affixed to the lid panel; and wherein the insert portion includes a first cutout aligned with the barcode or indicia of the stored value card;

wherein the back panel includes a second cutout configured to be aligned with the first cutout when the insert portion is slidably received in the closed position, wherein the sleeve portion foldably forms a box; and wherein the lid panel comprises one or more tabs configured as attachment points to engage with adornments comprising one or more ribbons or bows.

9. The device of claim 8, wherein the insert portion further comprises an adhesive for removably engaging the stored value card.

10. The device of claim 8, further comprising a flap on the front panel and a tab on the lid panel.

11. The device of claim 10, wherein the front panel and the lid panel each present a closing mechanism.

12. The device of claim 11, wherein the closing mechanism is a hook-and-loop fastener.

13. The device of claim 8, wherein the front panel has a first flap along the first edge of the front panel, and a second flap along the second edge of the front panel, wherein the first and second flaps attach the front of the sleeve to the back panel.

14. The device of claim 8, wherein the barcode or indicia facilitate the activation of the stored value card.

* * * * *